(12) United States Patent
Ramireddy et al.

(10) Patent No.: US 10,886,985 B2
(45) Date of Patent: Jan. 5, 2021

(54) RECEIVER, TRANSMITTER, SYSTEM AND METHOD EMPLOYING SPACE-DELAY PRECODING

(71) Applicant: Fraunhofer-Gesellschaft zur Förderung der angewandten Forschung e.V., Munich (DE)

(72) Inventors: Venkatesh Ramireddy, Erlangen (DE); Markus Landmann, Erlangen (DE); Marcus Großmann, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/783,994

(22) Filed: Feb. 6, 2020

(65) Prior Publication Data

US 2020/0177249 A1    Jun. 4, 2020

Related U.S. Application Data

(63) Continuation of application No. PCT/EP2018/055678, filed on Mar. 7, 2018.

(30) Foreign Application Priority Data

Oct. 18, 2017  (EP) ..................................... 17197119

(51) Int. Cl.
*H04B 7/04*    (2017.01)
*H04B 7/0456*  (2017.01)
*H04B 7/0417*  (2017.01)
*H04B 7/06*    (2006.01)

(52) U.S. Cl.
CPC ......... *H04B 7/0486* (2013.01); *H04B 7/0417* (2013.01); *H04B 7/0469* (2013.01); *H04B 7/0626* (2013.01)

(58) Field of Classification Search
CPC .......... H04B 7/02; H04B 7/04; H04B 7/0417; H04B 7/0421; H04B 7/0456;
(Continued)

(56) References Cited

U.S. PATENT DOCUMENTS

2008/0318613 A1* 12/2008 Balachandran ...... H04B 7/0617
455/522
2014/0093005 A1   4/2014 Xia et al.
(Continued)

FOREIGN PATENT DOCUMENTS

EP        3358754 A1     8/2018
EP        3358756 A1     8/2018
(Continued)

OTHER PUBLICATIONS

Dahlman et al., "4G: LTE/LTE-Advanced for Mobile Broadband," 2011, Academic Press, MA, USA.
(Continued)

*Primary Examiner* — Siu M Lee
(74) *Attorney, Agent, or Firm* — Novick, Kim & Lee, PLLC; Jae Youn Kim; Jihun Kim

(57) ABSTRACT

A receiver receives and processes a radio signal received via a frequency selective radio channel from a transmitter employing a plurality of transmit antennas. The receiver determines, based on the received signal, complex precoder coefficients and delays of respective space-delay precoders for each layer and transmit antenna at the transmitter so as to achieve a predefined property for a communication over the radio channel, each space-delay precoder modeling or defining for the associated transmit antenna a plurality of cyclic filters delaying and weighting a signal to be transmitted with the corresponding precoder delays and complex precoder coefficients, respectively, and feeds back to the transmitter the determined delays explicitly or implicitly and
(Continued)

the determined complex precoder coefficients explicitly or implicitly, the transmitter precoding the signals to be transmitted to the receiver using the fed back delays and complex precoder coefficients.

25 Claims, 9 Drawing Sheets

(58) Field of Classification Search
CPC .. H04B 7/0478; H04B 7/0482; H04B 7/0486; H04B 7/0469; H04B 7/061; H04B 7/0626; H04B 7/0673; H04B 7/08; H04B 7/0828; H04L 25/0212; H04L 25/0214; H04L 25/0216; H04L 25/03; H04L 25/03898
See application file for complete search history.

(56) References Cited

U.S. PATENT DOCUMENTS

| | | | |
|---|---|---|---|
| 2016/0173180 A1 | 6/2016 | Cheng et al. | |
| 2016/0277083 A1* | 9/2016 | Koike-Akino | H04B 7/0456 |
| 2017/0134082 A1* | 5/2017 | Onggosanusi | H04B 7/0647 |

FOREIGN PATENT DOCUMENTS

| | | |
|---|---|---|
| WO | 2008-098092 A2 | 8/2008 |
| WO | 2014-198037 A1 | 12/2014 |
| WO | 2018-228707 A1 | 12/2018 |

OTHER PUBLICATIONS

3GPP TR 36.897 V13.0.0, "3rd Generation Partnership Project; Technical Specification Group Radio Access Network; Study on elevation beamforming / Full-Dimension (FD) Multiple Input Multiple Output (MIMO) for LTE (Release 13)," Jun. 2015.
3GPP TR 38.802 V14.1.0, "3rd Generation Partnership Project; Technical Specification Group Radio Access Network; Study on New Radio access technology: Physical layer aspects (release 14)," Jun. 2017.
Fessler et al., "Space-alternating generalized expectation-maximization algorithm," IEEE transactions on Signal Processing, vol. 42, No. 10, pp. 2664-2677, Oct. 1994.
3GPP TS 38.214 V13.0.0, "3rd Generation Partnership Project; Technical Specification Group Radio Access Network; NR; Physical layer procedures for data (Release 15)," Jan. 2018.
Liang et al., "Time-domain transmit beamforming for MIMO-OFDM systems with finite rate feedback", IEEE transactions on Communications, vol. 57, No. 9, pp. 2828-2838, Sep. 2009.
Fraunhofer Iis et al., "Enhancements on Type—II CSI Reporting Scheme", 3GPP Draft; R1-1806124, 3rd Generation Partnership Project (3GPP), Mobile competence Centre; 650, Route des Lucioles; F-06921 Sophia-Antipolis CECEX; France, vol. RAN WG1, no. Busan, South Korea; 20180521-20180525, May 20, 2018.
Samsung "Codebook design framework for NR MIMO", 3GPP Draft; R1-1700912, Codebook Design Framework for NR MIMO R1, 3rd Generation Partnership Project (3GPP), Mobile Competence Centre; 650, Route des Lucioles; F-06921 Sophia-Antipolis Cedex; France, vol. RAN WG1, no. Spokane, USA; 20170116-20170120, Jan. 16, 2017.
Fraunhofer et al.: "Space-delay versus Sub-band Precoding for mmWave Channels", 3GPP Draft; R1-1800597, 3rd Generation Partnership Project (3GPP), Mobile Competence Centre; 650, Route des Lucioles; F-06921 Sophia-Antipolis Cedex; France, vol. TSG RAN, no. Vancouver, Canada; 20180122-20180126, Jan. 12, 2018.
3GPP TS 36.211, "Technical Specification Group Radio Access Network; Evolved Universal Terrestrial Radio Access (E-UTRA); Physical Channels and Modulation (Release 10)," V10.4.0, Dec. 2011.

* cited by examiner

RECEIVER, TRANSMITTER, SYSTEM AND METHOD EMPLOYING SPACE-DELAY PRECODING

CROSS-REFERENCES TO RELATED APPLICATIONS

This application is a continuation of copending International Application No. PCT/EP2018/055678, filed Mar. 7, 2018, which is incorporated herein by reference in its entirety, and additionally claims priority from European Application No. EP 17197119.5, filed Oct. 18, 2017, which is incorporated herein by reference in its entirety.

The present invention concerns the field of wireless communication systems, such as a mobile communication network. Embodiments of the present invention relate to wireless communication systems employing precoding with reduced feedback, e.g., space-delay wideband MIMO (Multiple Input Multiple Output) precoding for mmWave systems

BACKGROUND OF THE INVENTION

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 and/or with each other via respective backhaul links $114_1$ to $114_5$, which are schematically represented in FIG. 1 by the arrows pointing to the "core". The core network 102 may be connected to one or more external networks.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration in the time domain and a given bandwidth in the frequency domain. The frame may have a certain number of subframes of a predefined length, and each subframe may include symbols, like OFDM symbols.

The wireless communication system may operate, e.g., in accordance with the LTE-Advanced pro standard or the 5G or NR (New Radio) standard.

The wireless communication system may be any single-tone or multicarrier system based on frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

In a wireless communication system like to one depicted schematically in FIG. 1, multi-antenna techniques may be used, e.g., in accordance with LTE or NR, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver.

In the following the downlink (DL) transmission in a mobile multiple input multiple output communication system is considered, i.e., the communication link carrying data traffic from a base station (eNodeB) to a mobile user equipment (UE). Considering a base station (eNodeB) with $N_{Tx}$ antennas and a mobile user equipment (UE), with $N_{Rx}$ antennas, the symbols received at a particular instant of time in a DL transmission at the UE, $y \in \mathbb{C}^{N_{Rx} \times 1}$, may be written as $$y = HFs + n$$

where $H \in \mathbb{C}^{N_{Rx} \times N_{Tx}}$ denotes the channel matrix, $F \in \mathbb{C}^{N_{Tx} \times N_s}$ represents the precoder matrix at the eNodeB, $n \in \mathbb{C}^{N_{Rx} \times 1}$ is the additive noise at the receiver, $s \in \mathbb{C}^{N_s \times 1}$ is the data vector transmitted by the eNodeB which has to be decoded by the UE, and $N_s$ denotes the number of data streams transmitted. The precoder matrix to be used at the eNodeB to map the data $s \in \mathbb{C}^{N_s \times 1}$ to the $N_{Tx}$ antenna ports is decided by solving an optimization problem that is based on the instantaneous channel information $H \in \mathbb{C}^{N_{Rx} \times N_{Tx}}$. In a closed-loop mode of communication, the UE estimates the state of the channel and transmits a report, like channel state information (CSI), to the eNodeB via a feedback channel in the uplink (the communication link carrying traffic from the UE to the eNodeB) so that the eNodeB may determine the precoding matrix (see reference [1]). There are also occasions when multiple-layer transmissions are performed without feedback from the UE to determine the precoding matrices. Such a mode of communication is called 'open-loop' and the eNodeB makes use of signal diversity and spatial multiplexing to transmit information (see reference [1]).

FIG. 2 shows a block-based model of a MIMO DL transmission using codebook-based-precoding in accordance with LTE release 8. FIG. 2 shows schematically the base station 200, the user equipment 300 and the channel 400, like a radio channel for a wireless data communication between the base station 200 and the user equipment 300. The base station includes an antenna array 202 having a plurality of antennas or antenna elements, and a precoder 204 receiving a data vector 206 and a precoder matrix F from a codebook 208. The channel 400 may be described by the channel matrix 402. The user equipment 300 receives the data vector 302 via an antenna or an antenna array 304 having a plurality of antennas or antenna elements. A feedback channel 500 between the user equipment 300 and the base station 200 is provided for transmitting feedback information.

In the case of an implicit feedback, the CSI transmitted by the UE 300 over the feedback channel 500 includes the rank index (RI), the precoding matrix index (PMI) and the channel quality index (CQI) allowing, at the eNodeB 200, deciding the precoding matrix, and the modulation order and coding scheme (MCS) of the symbols to be transmitted. The PMI and the RI are used to determine the precoding matrix from a predefined set of matrices $\Omega$ called 'codebook' 208. The codebook 208, e.g., in accordance with LTE, may be a look-up table with matrices in each entry of the table, and the PMI and RI from the UE decide from which row and column of the table the precoder matrix to be used is obtained.

With explicit CSI feedback, no codebook is used to determine the precoder. The coefficients of the precoder matrix are transmitted explicitly by the UE. Alternatively, the coefficients of the instantaneous channel matrix may be transmitted, from which the precoder is determined by the eNodeB.

The design and optimization of the precoder 204 and the codebook 208 may be performed for eNodeBs equipped with 1-dimensional Uniform Linear Arrays (ULAs) or 2-dimensional Uniform Planar Arrays (UPAs) having a fixed down-tilt. These antenna arrays 202 allow controlling the radio wave in the horizontal (azimuth) direction so that azimuth-only beamforming at the eNodeB 200 is possible. In accordance with other examples, the design of the codebook 208 is extended to support UPAs for transmit beamforming on both vertical (elevation) and horizontal (azimuth) directions, which is also referred to as full-dimension (FD) MIMO (see reference [2]). The codebook 208, e.g., in the case of massive antenna arrays such as FD-MIMO, may be a set of beamforming weights that forms spatially separated electromagnetic transmit/receive beams using the array response vectors of the array. The beamforming weights (or the 'array steering vectors') of the array are amplitude gains and phase adjustments that are applied to the signal fed to the antennas (or the signal received from the antennas) to transmit (or obtain) a radiation towards (or from) a particular direction. The components of the precoder matrix are obtained from the codebook of the array, and the PMI and the RI are used to 'read' the codebook and obtain the precoder. The array steering vectors may be described by the columns of a 2-D Discrete Fourier Transform (DFT) matrix (see reference [3]).

The frequency-domain precoder matrices used in the Type-I and Type-II CSI reporting schemes in 3GPP New Radio Release 15 have a dual-stage structure: $F(s)=F_1F_2(s)$, $s=0, \ldots, S-1$ (see reference [7]), where S denotes the number of subbands/subcarriers or physical resource blocks (PRB). The matrix $F_1$ is a wide-band matrix, independent on index s, and contains PU beamforming vectors $s_u^p \in \mathbb{C}^{C \times 1}$, $p=1, \ldots, P$ selected out of a DFT codebook matrix, $$F_1(s) = \begin{bmatrix} s_1^1 & \ldots & s_u^1 & \ldots & s_U^1 & \ldots & & & 0 \\ & \vdots & & & \ddots & & & \vdots & \\ 0 & & & & \ldots & s_1^P & \ldots & s_u^P & \ldots & s_U^P \end{bmatrix} \in \mathbb{C}^{AP \times UP},$$

where A denotes the number of transmit antennas per polarization, and P denotes the number of antenna polarizations, and U is the number of beamforming vectors per polarization. For co-polarized antenna arrays, P=1, whereas for dual-polarized antenna arrays, P=2. Moreover, for dual-polarized antenna arrays, the u-th beam vectors $s_u^1 = s_u^2$, $\forall u$ are identical for both polarizations. The matrix $F_2(s)$ is a selection/combining/co-phasing matrix that selects/combines/co-phase the beams defined in $F_1$ for each subband/subcarrier or physical resource block (PRB) s. It is noted that multiple antenna elements oriented in different directions may be placed at each position in an array antenna to make use of the polarization diversity while transmitting/receiving a signal. The orientation of the antenna element in many cases is the same as the polarization angle the antenna responds to and, hence, the term 'antenna polarization' and 'antenna orientation' are used interchangeably across literature. In this specification, the term 'orientation' is used when referring to antennas to avoid confusing with the polarization of a transmitted or a received wavefront.

For a rank-1 transmission and Type-I reporting, $F_2(s)$ is given for dual-polarized antenna arrays (P=2) by [7]

$$F_2(s) = \begin{bmatrix} e_u \\ e^{j\delta_1} e_u \end{bmatrix} \in \mathbb{C}^{U \cdot 2 \times 1},$$

where $e_u \in \mathbb{C}^{U \times 1}$, $u=1, 2, \ldots, U$ contains zeros at all positions except the $u_{th}$ position. Such a definition of $e_u$ selects the $u_{th}$ vector for each polarization and combines them across different polarizations. Furthermore, $\delta_1$ is a quantized phase adjustment for the second polarization.

For a rank-1 transmission and Type-II reporting, $F_2(s)$ is given for dual-polarized antenna arrays (P=2) by [7]

$$F_2(s) = \begin{bmatrix} e^{j\delta_1} p_1 \\ e^{j\delta_{2U}} p_{2U} \end{bmatrix} \in \mathbb{C}^{U \cdot 2 \times 1}$$

where the quantized values $p_u$ and $\delta_u$, $u=1, 2, \ldots, 2U$ are the amplitude and phase combing coefficients, respectively.

For rank-R transmission, $F_2(s)$ contains R vectors, where the entries of each vector are chosen to combine single or multiple beams within each polarization and/or combining them across different polarizations.

SUMMARY

According to an embodiment, a receiver may be configured to
receive and process a radio signal received via a frequency selective radio channel from a transmitter employing a plurality of transmit antennas,
determine, based on the received signal, complex precoder coefficients and delays of respective space-delay precoders for each layer and transmit beam at the transmitter so as to achieve a predefined property for a communication over the radio channel, wherein each space-delay precoder may have: a double-stage precoding structure, the double-stage precoding structure including a beamforming matrix that contains PU spatial beams, U=total number of beams, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including complex delay-domain combining-coefficients associated with the beams and the delays,
feed back to the transmitter the determined delays and the determined complex precoder coefficients, the complex precoder coefficients including the complex delay-domain combining-coefficients,
wherein the feedback includes a precoding matrix identifier, PMI, the PMI indicating a number of indices of the respective spatial beams of the radio signal, the respective complex delay-domain combining-coefficients, and a number of indices of the delays associated with respective column vectors of a codebook matrix.

According to another embodiment, a transmitter may have: an antenna array having a plurality of antennas for a wireless communication with one or more receivers; and a precoder connected to the antenna array, the precoder to apply a set of beamforming weights to one or more antennas of the antenna array to form, by the antenna array, one or more transmit beams, wherein the transmitter is configured to determine the beamforming weights responsive to a feedback received from a receiver, the feedback indicating delays and complex precoder coefficients, the indicated delays and complex precoder coefficients obtained based on respective space-delay precoders for each layer and transmit beam at the transmitter so as to achieve a predefined property for a communication over a radio channel to the receiver, the complex precoder coefficients including complex delay-domain combining-coefficients, and wherein each space-delay precoder may have: a double-stage precoding structure, the double-stage precoding structure including a beamforming matrix that contains PU spatial beams, U=total number of beams, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including the complex delay-domain combining-coefficients associated with the beams and the delays, and wherein the feedback includes a precoding matrix identifier, PMI, the PMI indicating a number of indices of the respective spatial beams of the radio signal, the respective complex delay-domain combining-coefficients, and a number of indices of the delays associated with respective column vectors of a codebook matrix.

According to another embodiment, a wireless communication network may have: at least one inventive receiver, and at least one inventive receiver.

According to another embodiment, a method may have the steps of: receiving and processing a radio signal received via a frequency selective radio channel from a transmitter employing a plurality of transmit antennas, determining, based on the received signal, complex precoder coefficients and delays of respective space-delay precoders for each layer and transmit beam at the transmitter so as to achieve a predefined property for a communication over the radio channel, wherein each space-delay precoder may have a double-stage precoding structure, the double-stage precoding structure including a beamforming matrix that contains PU spatial beams, U=total number of beams, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including complex delay-domain combining-coefficients associated with the beams and the delays, and feeding back to the transmitter the determined delays and the determined complex precoder coefficients, the complex precoder coefficients including the complex delay-domain combining-coefficients, wherein the feedback includes a precoding matrix identifier, PMI, the PMI indicating a number of indices of the respective spatial beams of the radio signal, the respective complex delay-domain combining-coefficients, and a number of indices of the of the delays associated with respective column vectors of a codebook matrix.

According to another embodiment, a method for forming one or more beams for a wireless communication among a transmitter and one or more receivers may have the step of: applying a set of beamforming weights to one or more antennas of an antenna array to form the beam, the beam comprising a transmit beam, wherein the beamforming weights are determined responsive to a feedback received from a receiver, the feedback indicating delays and complex precoder coefficients, the indicated delays and complex precoder coefficients obtained based on respective space-delay precoders for each layer and transmit beam at the transmitter so as to achieve a predefined property for a communication over a radio channel to the receiver, the complex precoder coefficients including complex delay-domain combining-coefficients, and wherein each space-delay precoder may have a double-stage precoding structure, the double-stage precoding structure including a beamforming matrix that contains PU spatial beams, U=total number of beams, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including the complex delay-domain combining-coefficients associated with the beams and the delays, and wherein the feedback includes wherein the feedback includes a precoding matrix identifier, PMI, the PMI indicating a number of indices of the respective spatial beams of the radio signal, the respective complex delay-domain combining-coefficients, and a number of indices of the of the delays associated with respective column vectors of a codebook matrix.

According to another embodiment, a non-transitory computer program product may have a computer readable medium storing instructions which, when executed on a computer, perform the inventive methods.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
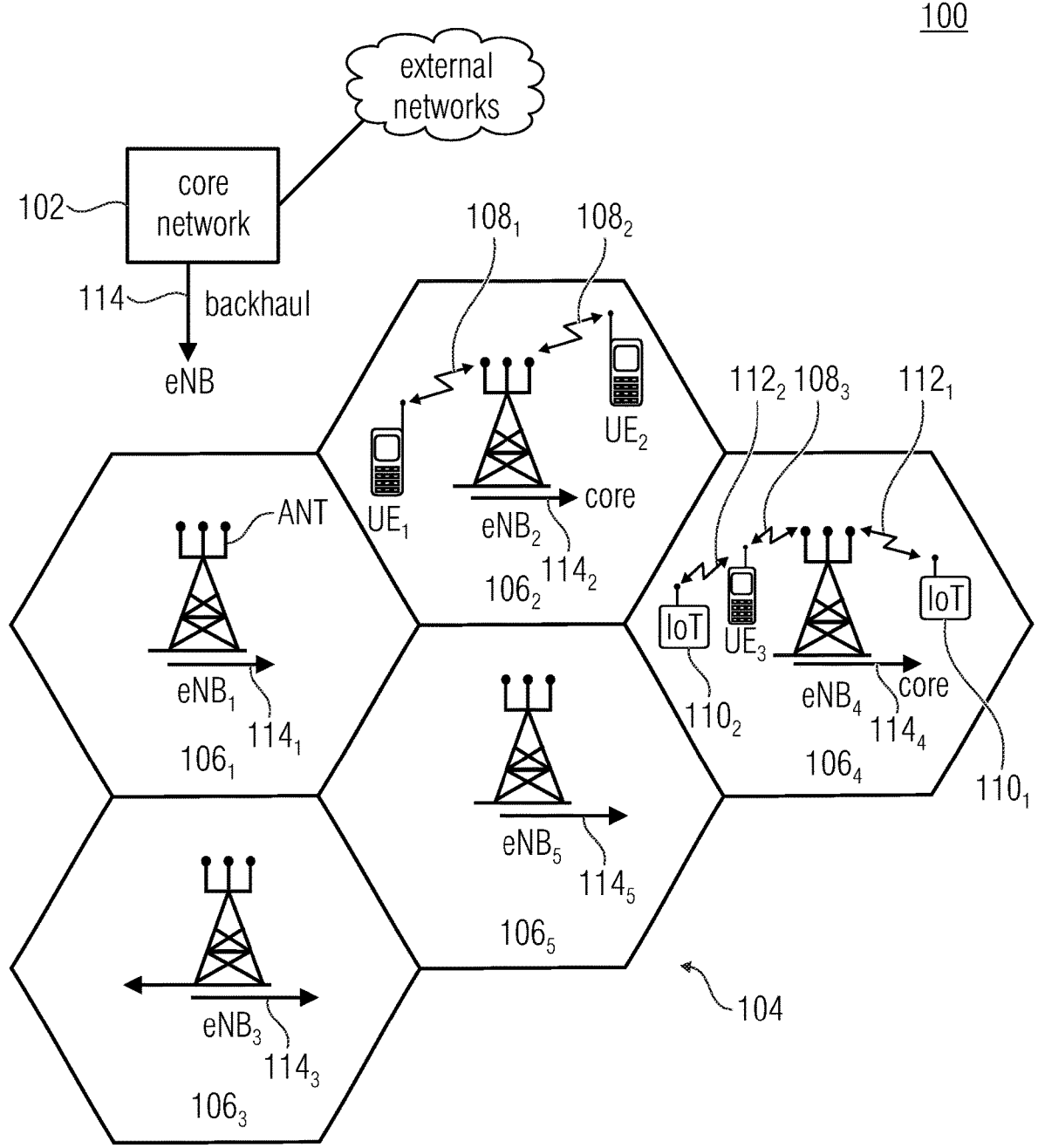
FIG. 1 shows a schematic representation of an example of a wireless communication system.

In the following, embodiments of the present invention will be described in further detail with reference to the enclosed drawings in which elements having the same or similar function are referenced by the same reference signs.

Embodiments of the present invention provide a receiver which receives and processes a radio signal received via a frequency selective radio channel from a transmitter employing a plurality of transmit antennas. The receiver determines, based on the received signal, complex precoder coefficients and delays of respective space-delay precoders for each layer and transmit antenna at the transmitter so as to achieve a predefined property for a communication over the radio channel, each space-delay precoder modeling or defining for the associated transmit antenna a plurality of cyclic filters delaying and weighting a signal to be transmitted with the corresponding precoder delays and complex precoder coefficients, respectively, and feeds back to the transmitter the determined delays explicitly or implicitly and the determined complex precoder coefficients explicitly or implicitly, the transmitter precoding the signals to be transmitted to the receiver using the fed back delays and complex precoder coefficients.

Further embodiments of the present invention provide a transmitter having an antenna array having a plurality of antennas for a wireless communication with one or more receivers, and a precoder connected to the antenna array, the precoder to apply a set of beamforming weights to one or more antennas of the antenna array to form, by the antenna array, one or more transmit beams. The transmitter determines the beamforming weights responsive to a feedback received from a receiver, the feedback indicating delays explicitly or implicitly and complex precoder coefficients explicitly or implicitly, the indicated delays and complex precoder coefficients obtained based on respective space-delay precoders for each layer and transmit antenna at the transmitter so as to achieve a predefined property for a communication over a radio channel to the receiver, each space-delay precoder modeling or defining for the associated transmit antenna a plurality of cyclic filters delaying and weighting a signal to be transmitted with the corresponding precoder delays and complex precoder coefficients, respectively.

As has been described above, conventionally, precoding is performed per subcarrier or per subband, a subband including multiple adjacent subcarriers, in OFDM-based systems. Due to the large number of subcarriers/subbands, transmitting a single PMI/RI per subcarrier/subband to the gNB leads to a prohibitively large feedback overhead. The problem of such a large feedback overhead is addressed in conventional OFDM systems, which precode in the frequency domain per sub-carrier or per subband, as follows. As fading gains are highly correlated across multiple adjacent subcarriers, a single precoding matrix may be calculated for a number of subcarriers, i.e., per subband, which may result in a reduced feedback overhead compared to the case when calculating a single precoding matrix per subcarrier.

However, in situations, in which the number of subcarriers/subbands is much larger than the number of non-zero channel impulse response coefficients, precoding in the time domain may be beneficial both in terms of computational complexity and feedback overhead.

Therefore, instead of precoding per subcarrier/subband, per delay precoding is performed in accordance with the inventive approach. In accordance with embodiments, the inventive approach employs a novel space-delay precoder with a reduction in feedback compared to the subcarrier/subband precoding and with higher mutual information or rate etc. In accordance with embodiments of the present invention a precoding and feedback scheme for single and/or multi-carrier MIMO communication systems is provided which, in addition to the feedback parameters described in 3GPP Rel. 10 (see reference [4]) like PMI, RI and CQI, provides additional feedback parameters such as tap delays for the signal precoder at the transmitter. The inventive feedback scheme allows for direction and delay-based beamforming/precoding with an enhanced performance in terms of mutual information or rate etc., compared to the state-of-the art beamforming/precoding schemes discussed until 3GPP LTE Rel 14 (see reference [5]).

In accordance with embodiments of the present invention the MIMO communication system may be operating at mmWave frequencies. At mmWave frequencies, the communication channels are sparse and the energy of the multipath components is concentrated in few channel clusters or channel taps, and a number of rays are associated with each cluster. Each channel cluster or channel-tap may correspond to a different delay and spatial direction. Thus, the number of dominant channel clusters or channel taps is typically much smaller than the number of subcarriers. Therefore, in systems operating at mmWave frequencies space-delay precoding is beneficial in terms of complexity and feedback overhead compared to conventional frequency-domain subcarrier-based or subband-based precoding. In accordance with the inventive approach, additional tap-delay information corresponding to dominant channel cluster directions may be exploited and fed back to the gNB. Utilizing the additional delay information of the cluster directions in designing the precoder may lead to an enhanced system performance in terms of mutual information or rate etc., due to the additional degrees of freedom considered.

The present invention is also applicable to a MIMO communication system operating at sub-6 GHz frequencies.

In accordance with embodiments the receiver is configured to feed back the delays of the space-delay precoder implicitly using a delay identifier including indices associated with respective column vectors of a frequency-domain codebook matrix used at the transmitter.

In accordance with embodiments the space-delay precoder is represented in the frequency domain, and wherein the receiver is configured to explicitly or implicitly feed back the delays of the space-delay precoder.

In accordance with embodiments the implicit delay feedback includes one or more delay identifiers, DI, each delay identifier including a set of $\bar{L}$ indices which are associated with column vectors of a frequency-domain codebook matrix D, L=total number of delays.

In accordance with embodiments the size of the codebook matrix D is flexibly designed based on the resolution of the delays that may be used.

In accordance with embodiments
the delays, $\tau(l) \in \mathbb{Z}$, $\forall l$, are discretized and are given by elements of a set $\mathbb{Z}=[0, \ldots, SO_f-1]$, and each value in $\mathbb{Z}$ is associated to a column vector of the frequency-domain codebook matrix D, with $l=0, 1, \ldots, L$, S=total number of subcarriers, or subbands, or physical resource blocks,
wherein the frequency-domain codebook matrix D is an oversampled codebook DFT-matrix $D=[d_0, d_1, \ldots, d_{SO_f-1}]$, where $$d_i = \begin{bmatrix} 1 & e^{\frac{-j2\pi i}{O_f S}} & \ldots & e^{\frac{-j2\pi i (S-1)}{O_f S}} \end{bmatrix}^T \in \mathbb{C}^{S \times 1},$$

$i \in \mathbb{Z}$, $j=\sqrt{-1}$ with $O_f$ being the oversampling factor of the frequency-domain codebook DFT-matrix.

In accordance with embodiments the receiver is configured to receive from the transmitter the oversampling factor $O_f$.

In accordance with embodiments a DI is associated with a spatial beam, and the feedback includes PU DIs for PU spatial beams, U=total number of beams, P=number of polarizations, where P=1 for co-polarized antenna arrays at the transmitter and P=2 dual-polarized antenna arrays at the transmitter.

In accordance with embodiments
the precoder comprises a double-stage precoding structure, the double-stage precoding structure including a beamforming matrix that contains PU spatial beams, U=total number of beams, and P=number of polarizations, where P=1 for co-polarized antenna arrays at the transmitter and P=2 dual-polarized antenna arrays at the transmitter,
(i) in case of identical delays for all PU beams, the feedback includes one delay identifier, 1 DI, for the PU beams, or
(ii) in case of polarization-dependent and beam-dependent delays, the feedback includes PU delay identifiers, PU DIs, for the PU beams, each DI containing indices for the delays associated with a single spatial beam, or
(iii) in case of polarization-independent and beam-dependent delays, the feedback includes U delay identifiers, U DIs, for the PU beams, or
(iv) in case of polarization-dependent and beam-independent delays, the feedback includes P delay identifiers, P DIs, for the PU beams, or In accordance with embodiments the number of indices in the DIs is identical or different with respect to the spatial beams.

In accordance with embodiments, d delay indices out of $\bar{L}$ delay indices in a delay identifier, DI, associated with a u-th spatial beam, are identical to the delay indices of DIs associated with one or more other spatial beams, then the DI of the u-th spatial beam contains $\bar{L}$-d indices instead of $\bar{L}$ indices.

In accordance with embodiments, in addition to beam-specific DIs that contain indices for specific spatial beams, a DI common to X (X=1 ... PU) spatial beams may be used to denote indices common to X spatial beams. Such multiple common DIs may become relevant when there are multiple sets of identical delays among DIs of different spatial beams.

In accordance with embodiments, a DI configuration may be signaled from the transmitter to the receiver. A DI configuration may contain, for example, information about
total number of indices per beam-specific DI, or
number of common DIs, number of indices per common DI.

In accordance with embodiments, in case the delays associated with a spatial beam are within a predefined window around a single mean delay, the delay identifier for the spatial beam includes only a single index associated with the mean delay.

In accordance with embodiments the receiver is configured to receive from the transmitter the window parameter specifying the predefined window-size.

In accordance with embodiments, in case of PU beams, the feedback includes PU DIs for the PU beams, with each DI containing only a single index.

In accordance with embodiments the feedback includes a single or multiple DIs for the spatial beams, with each DI containing a single or multiple indices, and each index is associated with a specific mean delay of the beam.

In accordance with embodiments the PU spatial beams have the same or different mean delays.

In accordance with embodiments the $\bar{L}$ complex delay-domain combining-coefficients of the u-th spatial beam associated with a certain mean delay index are used to calculate the complex combining-coefficients of the remaining or other PU−1 beams for the certain mean delay index.

In accordance with embodiments the complex coefficients for the remaining 2U−1 beams corresponding to the mean delay index $b_{u,\bar{l}}$ of the u-th beam are given by $$\hat{K}_2 = [e_{1,u} \ldots e_{g,u} \ldots e_{2U-1,u}]^T \otimes K_{2,u} \in \mathbb{C}^{2U \times \bar{L}}$$

where $e_{g,u}$ is the scalar complex coefficient associated with the g-th beam (g≠u) and $K_{2,u} \in \mathbb{C}^{1 \times \bar{L}}$ contains $\bar{L}$ delay-combining coefficients associated with the u-th beam and mean delay index $b_{u,\bar{l}}$.

In accordance with embodiments the feedback includes a set of indices, like a precoding matrix identifier, PMI, the set of indices comprising a first number of indices indicating respective spatial beams of the radio signal, a second number of indices indicating the respective complex delay-domain combining-coefficients, and a third number of indices associated to the delays contained in the delay identifier(s).

In accordance with embodiments
the receiver is configured to feed back the delays of the space-delay precoder explicitly by
(i) setting a reference delay to all antennas or beams, the L−1 delay differences with respect to the reference delay are fed back to the transmitter, or
(ii) setting a reference delay per antenna or beam, the L−1 delay differences per antenna or beam with respect to the reference delay per antenna or beam are fed back to the transmitter; or
the receiver is configured to feed back the delays of the space-delay precoder implicitly by (i) setting a reference delay to all antennas or beams, L−1 indices associated with the L−1 delay differences with respect to the reference delay are fed back, or (ii) setting a reference delay per antenna or beam, L−1 indices per antenna or beam associated with the L−1 delay differences per antenna or beam with respect to the reference delay per antenna or beam are fed back to the transmitter.

In accordance with embodiments the delays $\tau_{n,r}(l)$ are antenna-specific and layer-specific or non-antenna-specific and non-layer-specific. In case of antenna-specific and layer-specific delays $\tau_{n,r}(l)$ the l-th delay $\tau_{n,r}(l)$ of the n-th transmit antenna, r-th layer, is different to the l-th delay $\tau_{k,p}(l)$ of the k-th transmit antenna, p-th layer, i.e., $\tau_{n,r}(l) \neq \tau_{k,r}(l)$, $\forall n, k, l, r, n \neq k$ and $\tau_{n,r}(l) \neq \tau_{n,p}(l)$, $\forall n, l, r, p, r \neq p$. In case of non-antenna-specific and non-layer-specific delays $\tau_{n,r}(l)$ the l-th delay $\tau_{n,r}(l)$ of the n-th transmit antenna, r-th layer, is identical to the l-th delay $\tau_{k,p}(l)$ of the k-th transmit antenna, p-th layer, i.e., $\tau_{n,r}(l) = \tau_{k,p}(l)$, $\forall n, k, l, r, p$.

In accordance with embodiments, in case of antenna-specific and layer-specific delays and explicit feedback of the complex precoder coefficients, in case of an explicit feedback of the delays, the feedback includes or the total feedback amounts to N·L·R complex precoder coefficients and N·L·R delays, and in case of an implicit feedback the delays, the feedback includes or the total feedback amounts to N·L·R complex precoder coefficients and L·R delay identifiers, where N denotes the number of transmit antennas, L denotes the number of delays per layer and per antenna, and R denotes the number of layers.

In accordance with embodiments, in case of non-antenna-specific and non-layer-specific delays and explicit feedback of the complex precoder coefficients, in case of an explicit feedback of the delays, the feedback includes or the total feedback amounts to N·L·R complex precoder coefficients and L delays, the L delays being identical to all N transmit antennas and R layers, and in case of an implicit feedback of the delays, the feedback includes N·L·R complex precoder coefficients and 1 delay identifier that specifies L delays, wherein the delays specified in the delay identifier are the delays of the precoder taps identical to all N transmit antennas and R layers.

In accordance with embodiments, in case of antenna-specific and layer-specific delays and implicit feedback of the complex precoder coefficients, the complex precoder coefficients per delay and per layer are based on one or more codebooks, and the feedback specifies matrices (PMIs) of complex precoder coefficients associated with the N transmit antennas, L delays and R layers, in case of an explicit feedback of the delays, the feedback includes or the total feedback amounts to L·R precoding matrix identifiers (PMIs) and N·L·R delays, and in case of an implicit feedback of the delays, the feedback includes or the total feedback amounts to L·R precoding matrix identifiers (PMIs) and L·R delay identifiers.

In accordance with embodiments, in case of non-antenna-specific and non-layer-specific delays and implicit feedback of the complex precoder coefficients, the complex precoder coefficients per delay and per layer are based on one or more codebooks, and the feedback specifies matrices (PMIs) of complex precoder coefficients associated with the N transmit antennas, L delays and R layers, in case of an explicit feedback of the delays, the feedback includes or the total feedback amounts to L·R precoding matrix identifiers (PMIs) and L delays, and in case of an implicit feedback of the delays, the feedback includes or the total feedback amounts to L·R precoding matrix identifiers (PMIs) and 1 delay identifier.

In accordance with embodiments, the codebook based scheme employs a precoder matrix per layer identical for all delays.

In accordance with embodiments, the precoder comprises a multi-stage structure, e.g., a dual-stage structure or a triple-stage structure. The multi-stage structure may comprise a beam-set matrix and at least one combination vector or combination matrix including complex combining coefficients per delay and per layer for the N transmit antennas, and a vector of delays, wherein the feedback further identifies, per delay, the complex combining coefficients explicitly or implicitly using a vector indicator, so that the feedback or the total feedback further includes the complex combining coefficients, when explicitly signaling the complex combining coefficients, or L·R vector indicators, when implicitly signaling the complex combining coefficients.

In accordance with embodiments the complex precoder coefficients per delay and per layer are based on one or more non-polarimetric codebooks or polarimetric codebooks. In case of polarimetric codebooks the complex precoder coefficients per delay and per layer include:

first complex precoder coefficients per delay and layer associated with a first polarization of a transmitted/incident wavefront, e.g., a horizontal polarization, for all antennas of a first orientation, and second complex precoder coefficients per delay and layer associated with a second polarization of a transmitted/incident wavefront, e.g., a vertical polarization, for all antennas of the first orientation, and third complex precoder coefficients per delay and layer associated with the first polarization of a transmitted/incident wavefront, e.g., the horizontal polarization, for all antennas of a second orientation, and fourth complex precoder coefficients per delay and layer associated with the second polarization of a transmitted/incident wavefront, e.g., the vertical polarization, for all antennas of the second orientation.

The feedback includes respective matrix identifiers for matrices of complex precoder coefficients per delay and per layer associated with the first polarization and the first antenna orientation, and the second polarization and the first antenna orientation, and the second polarization and the first antenna orientation, and the second polarization and the second antenna orientation, respectively.

The present invention may be applied to single carrier or multi-carrier wireless communication systems based on frequency division multiplexing such as OFDM, discrete Fourier transform spread OFDM (DFT-s-OFDM), etc. The following description of embodiments is based on an OFDM system model for a multi-carrier MIMO system with N transmit antennas and M receive antennas. The frequency-selective channel $h_{m,n}$ between the $n_{th}$ Tx antenna and the $m_{th}$ Rx antenna comprises Q path components, $$h_{m,n} = [h_{m,n}(0) \ldots h_{m,n}(u) \ldots h_{m,n}(Q-1)]^T \in \mathbb{C}^Q$$

The transmitted data is organized in transmission blocks, where each block $b \in \mathbb{C}^{SR}$ of length SR is linearly precoded with a precoding matrix $K \in \mathbb{C}^{NS \times NR}$ with S being the number of subcarriers. As a result, R data layers are transmitted per block resulting in a rank-R transmission.

Assuming a cyclic-prefix (CP) transmission, the CP being at least of length (Q−1), the received signal vector (after CP removal) at the UE may be written as $$y = HKb + n \in \mathbb{C}^{MS}$$

where H denotes a block-circulant MIMO channel matrix $$H = \begin{bmatrix} H_{1,1} & H_{1,2} & \ldots & H_{1,N} \\ H_{2,1} & H_{2,2} & \ldots & H_{2,N} \\ \vdots & \vdots & \vdots & \vdots \\ H_{M,1} & H_{M,2} & \ldots & H_{M,N} \end{bmatrix} \in \mathbb{C}^{MS \times NS},$$

$H_{m,n}$ is the S×S sized circulant matrix of link (m, n) with $[h_{m,n}\ 0_{S-Q}^T]^T \in \mathbb{C}^S$ on its first column and n is the noise.

The precoder matrix for a rank-1 transmission is given by $$K = \begin{bmatrix} K_{1,1} \\ K_{2,1} \\ \vdots \\ K_{N,1} \end{bmatrix} \in \mathbb{C}^{NS \times N},$$

the precoder matrix for a rank-R transmission is given by $$K = \begin{bmatrix} K_{1,1} & K_{1,2} & \ldots & K_{1,R} \\ K_{2,1} & K_{2,2} & \ldots & K_{2,R} \\ \vdots & \vdots & \vdots & \vdots \\ K_{N,1} & K_{N,2} & \ldots & K_{N,R} \end{bmatrix} \in \mathbb{C}^{NS \times SR}$$

with $K_{n,r}$ being the circulant precoder matrix of size S×S.

The frequency-domain representation of the block-circulant MIMO channel matrix and the precoder matrix is given by $\overline{H} = D_N H D_M^H$ and $\overline{K} = D_N K D_N^H$, respectively, where $D_N = I_N \otimes D$, with D being the DFT-matrix of size S.

The MIMO channel matrix in the frequency domain is given by $$\overline{H} = \begin{bmatrix} \overline{H}_{1,1} & \overline{H}_{1,2} & \ldots & \overline{H}_{1,N} \\ \overline{H}_{2,1} & \overline{H}_{2,2} & \ldots & \overline{H}_{2,N} \\ \vdots & \vdots & \vdots & \vdots \\ \overline{H}_{M,1} & \overline{H}_{M,2} & \ldots & \overline{H}_{M,N} \end{bmatrix} \in \mathbb{C}^{MS \times NS}$$

where $\overline{H}_{m,n}$ is a diagonal matrix with channel coefficients $\overline{H}_{m,n}(s)$ of all subcarriers on the main diagonal $$\overline{H}_{m,n} = \text{diag}\{\overline{H}_{m,n}(1) \ldots \overline{H}_{m,n}(s) \ldots \overline{H}_{m,n}(S)\}.$$

The precoder matrix in the frequency domain for the r-th layer is given by $$\overline{K}_r = [\overline{K}_{1,r}^T, \ldots, \overline{K}_{n,r}^T, \ldots, \overline{K}_{N,r}^T]^T$$

where $\overline{K}_{n,r} = \text{diag}\{\overline{K}_{n,r}(1), \ldots, \overline{K}_{n,r}(s), \ldots, \overline{K}_{n,r}(S)\}$ is a diagonal matrix that consists of precoder coefficients of all subcarriers on the main diagonal.

By rearranging, the MIMO channel matrix associated with subcarrier s, is $$\overline{H}(s) = \begin{bmatrix} \overline{H}_{1,1}(s) & \overline{H}_{1,2}(s) & \ldots & \overline{H}_{1,N}(s) \\ \overline{H}_{2,1}(s) & \overline{H}_{2,2}(s) & \ldots & \overline{H}_{2,N}(s) \\ \vdots & \vdots & \vdots & \vdots \\ \overline{H}_{M,1}(s) & \overline{H}_{M,2}(s) & \ldots & \overline{H}_{M,N}(s) \end{bmatrix} \in \mathbb{C}^{M \times N}$$

The precoder matrices for a rank-1 transmission associated with subcarrier s are $$\overline{K}_1(s) = \begin{bmatrix} \overline{K}_{1,1}(s) \\ \overline{K}_{2,1}(s) \\ \vdots \\ \overline{K}_{N,1}(s) \end{bmatrix} \in \mathbb{C}^N,$$

the precoder matrices for a rank-R transmission associated with subcarrier s are $$\overline{K}(s) = \begin{bmatrix} \overline{K}_{1,1}(s) & \overline{K}_{1,2}(s) & \ldots & \overline{K}_{1,R}(s) \\ \overline{K}_{2,1}(s) & \overline{K}_{2,2}(s) & \ldots & \overline{K}_{2,R}(s) \\ \vdots & \vdots & \vdots & \vdots \\ \overline{K}_{N,1}(s) & \overline{K}_{N,2}(s) & \ldots & \overline{K}_{N,R}(s) \end{bmatrix} \in \mathbb{C}^{N \times R}$$

Figure 2:
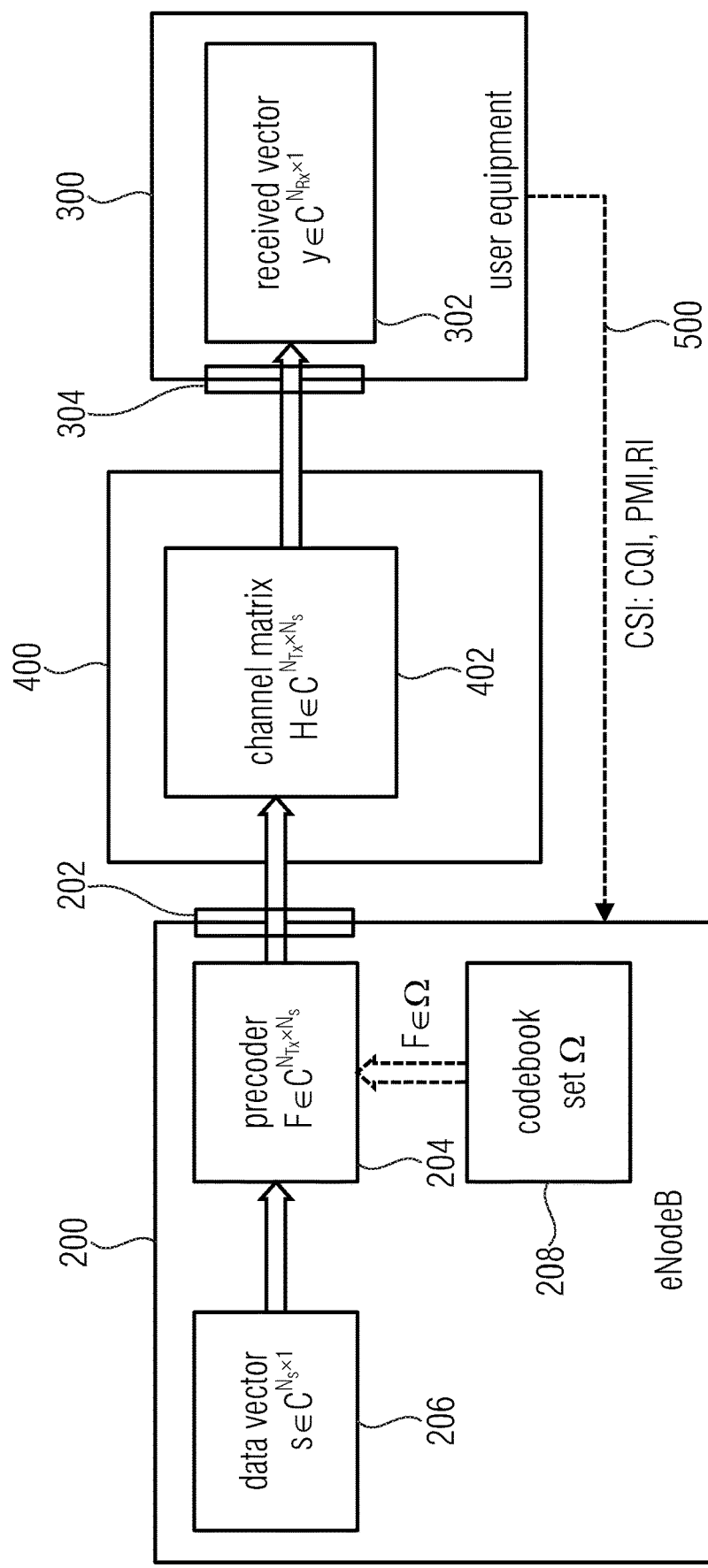
FIG. 2 shows a block-based model of a MIMO communication system using implicit CSI feedback.
Figure 3:
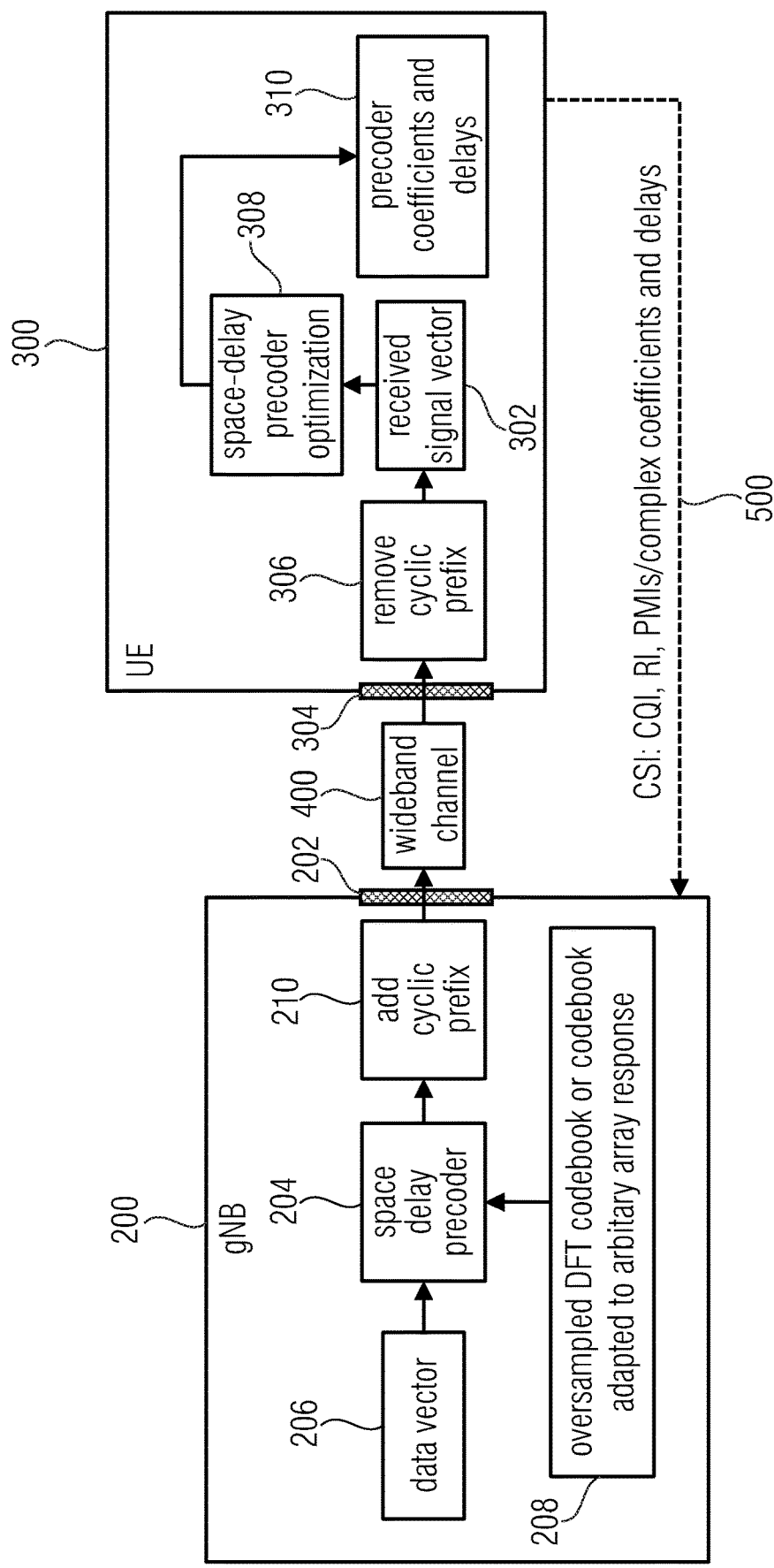
FIG. 3 shows a block diagram of a MIMO system in accordance with embodiments of the inventive approach.

FIG. 3 shows a block diagram of a MIMO system in accordance with embodiments of the inventive approach. Those elements of the MIMO system corresponding to elements described above with reference to FIG. 2 have assigned thereto the same reference signs. The user equipment 300 receives at the antenna or the antenna array 304 the radio signal from the channel 400. After removing the cyclic prefix, as is indicated at 306, the user equipment 300 processes the received signal to obtain the data vector 302. In accordance with embodiments of the present invention, the received signal is processed to determine, as is indicated at 308, and provide, as is indicated at 310, complex precoder coefficients and delays of respective space-delay precoders for each layer and transmit antenna at the base station 200 so as to achieve a predefined property for a communication over the radio channel. For example, at 308, the complex coefficients and the delays of the space-delay precoder (see equation (1) below) may be optimized at the UE 300 to achieve a predefined property for a communication over the radio channel, e.g., by maximizing a cost function such as mutual information or rate based on long- and short-term channel state information, as is described in more detail below. The optimized precoder taps and delays are fed back to the gNB 200 over the feedback channel 500 via implicit or explicit feedback schemes or a combination of both. Embodiments of feedback schemes for polarimetric and non-polarimetric cases are described in more detail below. In accordance with embodiments the feedback may include further parameters, e.g., CQI and RI as also used in conventional approaches.

Figure 4:
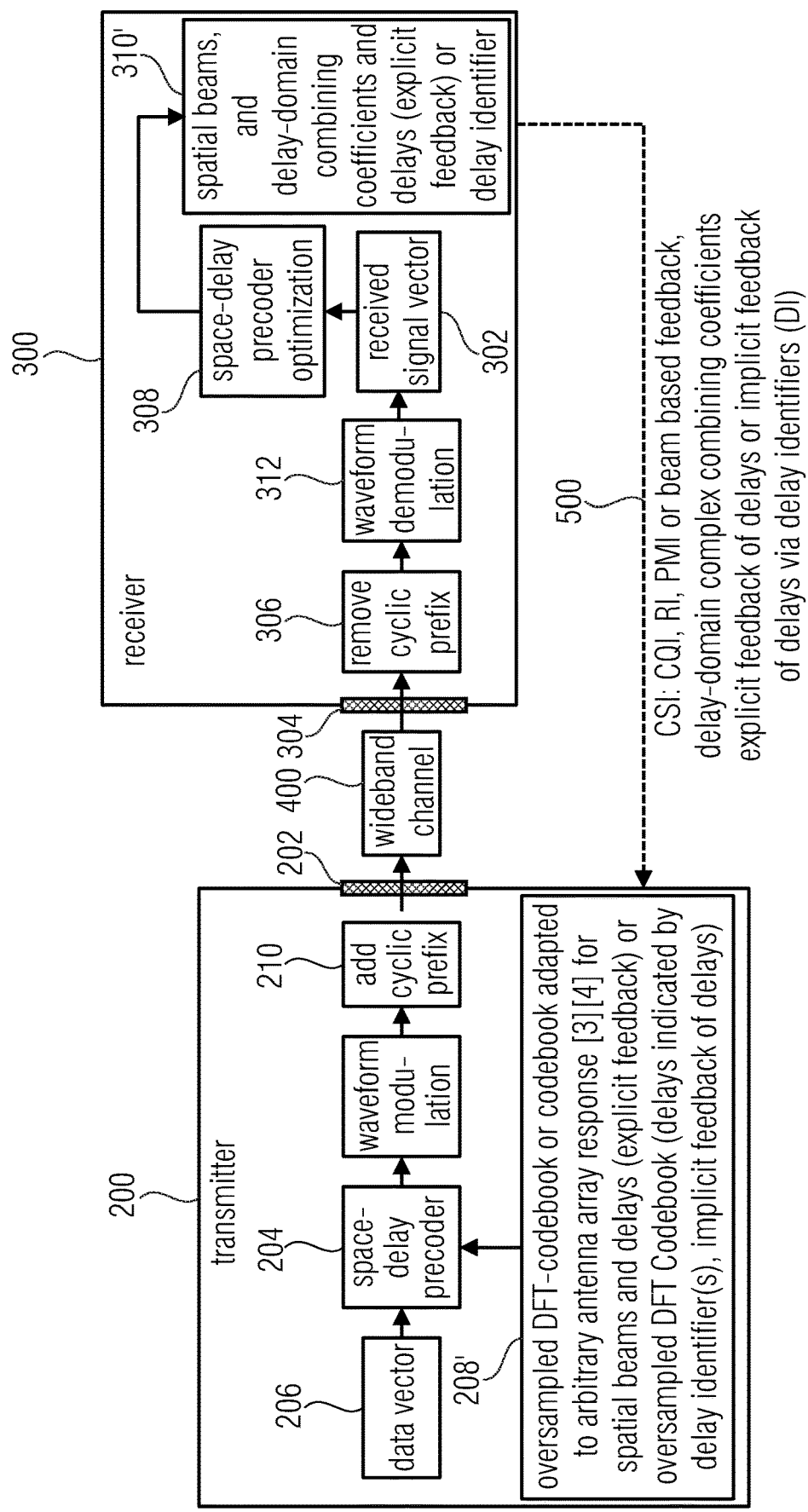
FIG. 4 shows a block diagram of a MIMO system in accordance with further embodiments of the inventive approach.

FIG. 4 shows a block diagram of a MIMO system in accordance with other embodiments of the inventive approach. Those elements of the MIMO system corresponding to elements described above with reference to FIG. 2 or FIG. 3 have assigned thereto the same reference signs. At the base station 200 also the waveform modulator 212 prior to adding the cyclic prefix 210 is indicated. The user equipment 300 receives at the antenna or the antenna array 304 the radio signal from the channel 400. After removing the cyclic prefix, as is indicated at 306 and waveform demodulation 312, the user equipment 300 processes the received signal to obtain the data vector 302. In accordance with embodiments of the present invention, the received signal is processed to determine, as is indicated at 308, and provide, as is indicated at 310', spatial beams as well as delay-domain combining coefficients and delays (explicit feedback) or a single or multiple delay identifier (implicit feedback) for each layer and transmit antenna at the base station 200 so as to achieve a predefined property for a communication over the radio channel. For example, at 308, the complex coefficients and the delays of the space-delay precoder may be optimized at the UE 300 to achieve a predefined property for a communication over the radio channel, e.g., by maximizing a cost function such as mutual information or rate based on long- and short-term channel state information, as is described in more detail below. The optimized precoder coefficients and delays are fed back to the gNB 200 over the feedback channel 500 via implicit or explicit feedback schemes or a combination of both. For example, the feedback may use CSI indicating CQI, RI, PMI or beam based feedback, delay-domain complex combining coefficients with an explicit feedback of delays or an implicit feedback of delays using delay identifiers (DI).

1$^{st}$ Embodiments: Time-Domain Representation of the Space-Delay Precoder

In accordance with embodiments, the space-delay precoders at 308 model or define for the associated transmit antenna a plurality of cyclic filters delaying and weighting a signal to be transmitted with the corresponding precoder delays and complex precoder coefficients, respectively. Thus, a parametric space-delay precoder scheme is provided where the precoder coefficients for the transmit antenna n and rank-r are defined by $$k_{n,r} = k_{n,r}(1) \cdot \delta(t - \tau_{n,r}(1)) + \ldots + k_{n,r}(l) \cdot \delta(t - \tau_{n,r}(l)) + \ldots + k_{n,r}(L) \cdot \delta(t - \tau_{n,r}(L)) \quad (1)$$

where $k_{n,r}(l)$ denotes the complex coefficient at delay $\tau_{n,r}(l)$.

The delays $\tau_{n,r}(l)$, $\forall l$ may be antenna-specific or not. Further, the delays may be defined for a specific sampling grid such that $\tau_{n,r}(l) \in \mathbb{C}^+$, $l=1, 2, \ldots, L$, where $\mathbb{C}^+$ denotes the positive integers, or the delays may be defined off the sampling grid, such that $\tau_{n,r}(l) \in \mathbb{Z}^+$, $l=1, 2, \ldots, L$, where $\mathbb{Z}^+$ denotes the positive real numbers. The sampling grid is a set of integer values of delays for which the channel coefficients are available. For the delays defined off the sampling grid, the channel coefficients are obtained by interpolation. The delays $\tau_{n,r}(l)$ may be antenna-specific and layer-specific so that the l-th delay $\tau_{n,r}(l)$ of the n-th transmit antenna, r-th layer, is different to the l-th delay $\tau^{k,p}(l)$ of the k-th transmit antenna, p-th layer, $$\tau_{n,r}(l) \neq \tau_{k,r}(l), \forall n,k,l,r,n \neq k,$$

$$\tau_{n,r}(l) \neq \tau_{n,p}(l), \forall n,l,r,p,r \neq p, \text{ or}$$

the delays $\tau_{n,r}(l)$ may be non-antenna-specific and non-layer-specific so that the l-th delay $\tau_{n,r}(l)$ of the n-th transmit antenna, r-th layer, is identical to the l-th delay $\tau_{k,p}(l)$ of the k-th transmit antenna, p-th layer, $$\tau_{n,r}(l) = \tau_{k,p}(l), \forall n,k,l,r,p.$$

For the on-grid delays a DFT may be used to calculate the frequency response of the space-delay precoder. The off-grid delays denote a non-uniform sampling of the space-delay precoder (see equation (1)) in the delay domain, and a DFT may not be used to calculate the frequency response of the space-delay precoder. For non-uniform sampling in delay, the discrete frequency response per subcarrier s is calculated using the non-uniform discrete Fourier transform (NUDFT) given by $$\overline{K}_{n,r}(s) = w(s) \cdot k_{n,r}$$

where $$w(s) = \left(\frac{1}{\sqrt{S}}\right) \left[ e^{-\frac{j2\pi s}{S} \tau_{n,r}(1)} \ldots e^{-\frac{j2\pi s}{S} \tau_{n,r}(l)} \ldots e^{-\frac{j2\pi s}{S} \tau_{n,r}(L)} \right] \in \mathbb{C}^L$$

is the NUDFT vector and $k_{n,r} = [k_{n,r}(1) \ldots k_{n,r}(l) \ldots k_{n,r}(L)]^T \in \mathbb{C}^L$ and $\overline{K}_{n,r}(s)$ is the precoder coefficient associated with subcarrier s and transmit antenna n and layer r. The complex coefficients $k_{n,r}(l)$, $\forall n, l, r$ and the delays $\tau_{n,r}(l)$, $\forall l, n, r$ of the space-delay precoder (see equation (1)) may be calculated at the UE and sent to the gNB with very less feedback.

In the embodiment of FIG. 3 or FIG. 4, the base station 200 may implement a conventional precoder, like the one described above with reference to FIG. 2, and a cyclic prefix 210 may be added to the signal to be applied to the antennas 202. In case of using a conventional precoder at the precoder, the base statio 200, responsive to the feedback from the UE 200, may calculate the frequency response of the space-delay precoder as described above and perform precoding in the frequency domain responsive to the obtained frequency response per subcarrier. In accordance with embodiments, the base station 200 may implement the space-delay precoders as described above. In accordance with embodiments, the base station 200 may operate on the basis of an oversampled DFT codebook, on the basis of a codebook adapted to antenna array imperfections, as described by Sutharshun Varatharaajan, Marcus Grolmann, Markus Landmann, "Beamforming codebook adaption to antenna array imperfections," European patent application 17154486.9 filed on Feb. 2, 2017, which is incorporated herewith by reference, or on the basis of a codebook adapted to a predefined antenna response of the antenna array, as described by Venkatesh Ramireddy, Marcus Grolmann, Markus Landmann, "Antenna array codebook with beamforming coefficients adapted to a predefined antenna response of the antenna array," European patent application 17154487.7 filed on Feb. 2, 2017, which is incorporated herewith by reference.

As mentioned above, at the user equipment 300, the complex coefficients and the delays of the space-delay precoder (see equation (1)) may be optimized to achieve a predefined property for a communication over the radio channel, e.g., by maximizing a cost function such as mutual information or the received signal to noise ratio (SNR) based on long- and short-term channel state information. In case the fed back delays are on the grid, the system model calculates the frequency response by the DFT matrices. In the case where the delays are not on the grid, the NUDFT may be used to calculate the frequency response per subcarrier.

In the following a rank-1 transmission is considered and the optimization problem and the feedback schemes are presented for the rank-1 transmission. For simplicity, the subscript r is omitted when referring to the rank-1 transmission. However, it is noted that the present invention is not limited to such embodiments and may also be implemented in a communication system employing a higher rank or layer communication, and the extension to a rank-R transmission is straightforward.

For a rank-1 transmission, the optimization problem that maximizes the average mutual information at the UE may be formulated as $$\max_{\substack{k_n, \forall n, \\ \tau_n(l), \forall n, l}} \frac{1}{S} \sum_{s=1}^{S} \log_2\left(\left|I_M + \frac{\overline{H}(s)\overline{K}(s)\overline{K}(s)^H \overline{H}(s)^H}{\sigma^2}\right|\right) \quad (2)$$

$$\text{s.t} \sum_{n=1}^{N} \sum_{s=1}^{S} |w(s) \cdot k_n|^2 \leq S$$

$$\tau_n(l) \in \mathbb{R}^+, \forall l, n,$$

where $k_n$ is a vector of length L containing the precoder complex coefficients associated with L delays.

Solving the optimization problem in equation (2), results in the precoder coefficients and delays that maximize the SNR at the UE so that apart from the complex coefficients feedback, N·L delays are fed back to the gNB.

For a rank-1 transmission, for the non-antenna specific case, where the delays are identical over all antennas, the optimization problem that maximizes the average mutual information at the UE is $$\max_{\substack{k_n, \forall n, \\ \tau_l, \forall l}} \frac{1}{S} \sum_{s=1}^{S} \log_2\left(\left|I_M + \frac{\overline{H}(s)\overline{K}(s)\overline{K}(s)^H \overline{H}(s)^H}{\sigma^2}\right|\right) \quad (3)$$

$$\text{s.t} \sum_{n=1}^{N} \sum_{s=1}^{S} |w(s) \cdot k_n|^2 \leq S$$

where $\tau_l = \tau_n(l)$, $\forall n$ and $k_n$ is a vector of length L containing the precoder complex coefficients associated with L delays.

Solving the optimization problem in equation (3), results in the precoder coefficients and the delays. The space-delay precoder obtained from solving equation (3) results in the feedback of only L delays to the gNB instead of N·L delays from equation (2).

Embodiments of the feedback schemes for polarimetric and non-polarimetric cases are now described for a system employing a rank-1 or layer-1 communication. In the case of antenna-specific delays, $\tau_1(l) \neq \tau_n(l) \neq \tau_N(l)$, $\forall l$, i.e., the $l_{th}$ delay is different across the transmit antennas. In case of non-antenna specific delays, $\tau_1(l) = \tau_n(l) = \tau_N(l)$, $\forall l$, i.e., the $l_{th}$ delay is identical across all transmit antennas.

Non-Polarimetric Case

The complex coefficients of the space-delay precoder are fed back using codebook or non-codebook based schemes, also the delays are fed back explicitly or implicitly. The implicit delay feedback is via a delay identifier (DI). Each DI refers to a specific set of delays, where each set is a made up of a combination of delays defined in the sampling grid or not. Each DI may refer to a specific set of delays associated with vectors from a codebook, where each set is a made up of a combination of delays defined in the sampling grid or not.

The complex coefficients corresponding to the $l_{th}$-delay position of all antennas is collected in a vector as $$k(l) = [k_1(l) k_2(l) \ldots k_N(l)]^T \in \mathbb{C}^N$$

Feedback Scheme 1: Explicit Feedback of Precoder Coefficients and Delays

Using explicit feedback, per delay, N complex coefficients and N delays associated with N transmit antennas, respectively, are be fed back to the gNB 200. Therefore, the total feedback amounts to N·L complex coefficients and N·L delays.

In the non-antenna specific case, the feedback amounts to N·L complex coefficients and L delays.

Codebook-Based Space-Delay Precoding

Considering a double stage precoding structure $F=F_1 F_2$ as described above, the corresponding delay-domain precoder $k(l)$ of $l_{th}$-delay may be written as $$k(l) = K_1(l) K_2(l),$$

where the delay-specific matrix $K_1(l)$ is a block diagonal matrix of size N×2U that contains 2U vectors and $K_2(l)$ is a combining/selection/co-phasing vector of size 2U×1 that combines 2U vectors.

The beamforming vectors in matrix $K_1$ may be selected either from an oversampled DFT codebook matrix, similar to $F_1$, or from an array response matched codebook designed for arbitrary antenna array configurations as described in the above mentioned European patent applications 17154486.9 or 17154487.7, which are incorporated herewith by reference.

Feedback Scheme 2: Implicit Feedback for $K_1$ and $K_2$

The feedback corresponding to matrix $K_1(l)$ and vector $K_2(l)$ from the UE 300 to the gNB 200 is indicated implicitly via PMI1 and PMI2, respectively. The precoder associated with the $l_{th}$ delay position is specified by PMI1 and PMI2 along with N delays associated with N transmit antennas. Therefore, for L delays, the total feedback amounts to L PMI1s+L PMI2s+N·L delays for the antenna specific case, and to L PMI1s+L PMI2s+L delays for the non-antenna specific case.

In accordance with embodiments, the space-delay precoder corresponding to the $l_{th}$ delay may be decomposed as $$k(l) = K_1 K_2(l)$$

where $K_1(l)$ is a wideband precoder matrix which is identical over all delays $K_1(1) = K_1(l) = K_1(L)$, $\forall l$, and $K_2(l)$ is the delay specific selection/combining/co-phasing vector. The feedback amounts to 1 PMI1+L PMI2s+N·L delays in the antenna specific case, and to 1 PMI1+L PMI2s+L delays in the non-antenna specific case.

Feedback Scheme 3: Implicit Feedback for $K_1$ and Explicit Feedback for $K_2$

The feedback associated with matrix $K_1(l)$ is similar as described in feedback scheme 2. The feedback for the 2U×1 sized vector $K_2(l)$ may be indicated to the gNB 200 explicitly with 2U complex entries.

The precoder associated with the $l_{th}$ delay position is specified by PMI1 and 2U complex values along with N delays associated with N transmit antennas.

For the L delays, in the antenna specific case the total feedback amounts to L PMI1s+2·L·U complex coefficients+N·L delays, and in the non-antenna specific case the feedback equals to L PMI1s+2·L·U complex coefficients+L delays.

In embodiments employing the above described wideband precoder matrix the feedback amounts to 1 PMI1+2·L·U complex coefficients+N·L delays for the antenna specific case, and to 1 PMI1+2·L·U complex coefficients+L delays for the non-antenna specific case.

For the feedback schemes 1, 2 and 3, the delays may also be fed back to the gNB implicitly via delay identifiers (DIs).

For antenna specific case, L DI's may be used for indicating the delays, where each DI is defined for the delays across the antennas. In the non-antenna specific case, a single DI suffices to indicate the delays to the gNB, and, since the delays are identical across antennas, the DI in this case defines the delays across the precoder taps.

Table 1 below summarizes the feedback for the feedback schemes discussed above for the non-polarimetric case.

| | | Feedback for $K_1(l)$ | Feedback for wideband $K_1$ | Feedback for $K_2(l)$ | Feedback for delays Implicit | Feedback for delays Explicit |
|---|---|---|---|---|---|---|
| Non-polarimetric case | | | | | | |
| Antenna specific case | Feedback scheme 1 | NL complex coefficients | | | L DIs | NL |
| | Feedback scheme 2 | L PMI1s | 1 PMI1 | L PMI2s | L DIs | NL |
| | Feedback scheme 3 | L PMI1s | 1 PMI1 | LU complex coefficients | L DIs | NL |
| Non-Antenna specific case | Feedback scheme 1 | NL complex coefficients | | | 1 DI | L |
| | Feedback scheme 2 | L PMI1s | 1 PMI1 | L PMI2s | 1 DI | L |
| | Feedback scheme 3 | L PMI1s | 1 PMI1 | LU complex coefficients | 1 DI | L |

Polarimetric Case
Feedback Scheme 1: Explicit Feedback of Precoder Coefficients and Delays Using explicit feedback, per delay, N complex coefficients and N delays associated with N transmit antennas, respectively, are be fed back to the gNB 200. Therefore, the total feedback amounts to N·L complex coefficients and N·L delays.

In the non-antenna specific case, the feedback amounts to N·L complex coefficients and L delays.
Codebook-Based Space-Delay Precoding Considering a double stage precoding structure $F=F_1F_2$ as described above, the precoder k(l) of $l_{th}$-delay may be written as $$k(l)=K_1(l)K_2(l),$$

where the delay-specific matrix $K_1(l)$ is a block diagonal matrix of size N×2U that contains 2U vectors and $K_2(l)$ is a combining/selection/co-phasing vector of size 2U×1 that combines 2U vectors.

The beamforming vectors in matrix $K_1$ may be selected either from an oversampled DFT codebook matrix or the array response matched codebooks designed for arbitrary antenna array configurations as described in the above mentioned European patent applications 17154486.9 or 17154487.7, which are incorporated herewith by reference.
Feedback Scheme 2: Implicit Feedback for $K_1$ and $K_2$ The precoder matrix indices for horizontal polarization and vertical polarizations are indicated by PMI1h and PMI1v, respectively, for precoder matrix $K_1(l)$. The feedback corresponding to vector $K_2$ (l) is indicated to the gNB via PMI2. For the $l_{th}$ delay, PMI1h and PMI1v associated with $K_1(l)$, respectively, and PMI2 associated with $K_2(l)$, along with N delays are fed back from the UE 300 to the gNB 200.

For the antenna specific case the feedback amounts to L PMI1hs+L PMI1vs+L PMI2+N·L delays, and for the non-antenna specific case the feedback is L PMI1hs+L PMI1vs+L PMI2+L delays.

If $K_1$ (l) is chosen as a wideband precoder matrix as described above, for the antenna specific case the total feedback is 1 PMI1h+1 PMI1v+L PMI2+N·L delays, and for the non-antenna specific case, the feedback is 1 PMI1h+1 PMI1v+L PMI2+L delays.

Feedback Scheme 3: Implicit Feedback for $K_1$ and Explicit Feedback for $K_2$

The feedback associated with matrix $K_1(l)$ is similar as described in feedback scheme 2 of the polarimetric case. For the $l_{th}$ delay position, the precoder matrix index for horizontal polarization (PMI1h) and the precoder matrix index for vertical polarization (PMI1v) for precoder matrix $K_1(l)$ and 2U complex coefficients for matrix $K_2(l)$ along with N delays are fed back from the UE 300 to the gNB 200.

For L delays, the feedback amounts to L PMI1hs+L PMI1vs+2·L·U complex coefficients+N·L delays for the antenna specific case, and to L PMI1hs+L PMI1vs+2·L·U complex coefficients+L delays for non-antenna specific case.

If $K_1$ (l) is chosen as a wideband precoder matrix as described above, for the antenna specific case the feedback is 1 PMI1h+1 PMI1v+2·L·U complex coefficients+N·L delays, whereas for the non-antenna specific case the total feedback is 1 PMI1h+1 PMI1v+2·L·U complex coefficients+L delays.

For the feedback schemes 1, 2 and 3, the delays may also be fed back to the gNB implicitly via the delay identifier (DI). For antenna specific case, L DI's may be used for indicating the delays, where each DI is defined for the delays across the antennas. In the non-antenna specific case, a single DI suffices to indicate the delays to the gNB, and, since the delays are identical across antennas, the DI in this case defines the delays across the precoder taps.

Table 2 below summarizes the feedback for the feedback schemes discussed above for the polarimetric case.

| | | Polarimetric case | | | | |
|---|---|---|---|---|---|---|
| | | Feedback for delay-specific $K_1(l)$ | Feedback for wideband $K_1$ | Feedback for delay-specific $K_2(l)$ | Feedback for delays Implicit | Feedback for delays Explicit |
| Antenna specific case | Feedback scheme 1 | NL complex coefficients | | | L DI's | NL |
| | Feedback scheme 2 | L PMI1h's + L PMI1v's | L PMI1h + 1 PMI1v | L PMI2s | L DI's | NL |
| | Feedback scheme 3 | L PMI1h's + L PMI1v's | 1 PMI1h + 1 PMI1v | LU complex coefficients | L DI's | NL |
| Non-Antenna specific case | Feedback scheme 1 | NL complex coefficients | | | 1 DI | L |
| | Feedback scheme 2 | L PMI1h's + L PMI1v's | 1 PMI1h + 1 PMI1v | L PMI2s | 1 DI | L |
| | Feedback scheme 3 | L PMI1h's + L PMI1v's | 1 PMI1h + 1 PMI1v | LU complex coefficients | 1 DI | L |

In accordance with embodiments, the inventive approach may also be employed for a MISO system. Based on the channel estimates, the delays that correspond to L dominant peaks in the time domain channel may be selected or chosen to be the L delays of the precoder, and based on the MRT (maximum ratio transmission) precoder calculated in the time domain, the L dominant peaks may be selected or chosen to be the L delays of the precoder.

In case delays of the channel are also estimated, the delays that correspond to the first L dominant peaks of the channel may be selected or chosen to be the L delays of the precoder, and the delays that corresponds to the first L dominant peaks of the MRT precoder may be selected or chosen to be the L delays of the precoder.

In case the channel delays are off the grid, a high-resolution parameter estimation approach may be used to estimate the delays, for example the space alternating generalized expectation-maximization (SAGE) algorithm (see reference [6]).

Some of the embodiments of the present invention have been described above with reference to two-dimensional (2D) uniform planar arrays (UPAs) using dual-stage/double-structure codebooks. However, the present invention is not limited to such embodiments and may also be implemented using triple-structure codebooks in accordance with the 5G or NR (New Radio) standard. Further, the present invention is not limited to 2D arrays. The inventive approach is equally applicable to any arbitrary antenna array configuration, like a one-dimensional (1D) uniform linear array (ULAs) on a three-dimensional (3D) array antenna, like cylindrical arrays or conical arrays. Three-dimensional (3D) array antennas are described, e.g., in PCT Patent Application PCT/EP2017/064828, "Transmitter, Receiver, Wireless Communication Network and Methods for Operating the Same" filed on 16 Jun. 2017, which is incorporated herewith by reference.

When considering a multi-panel array with $P_R$ panels in each row and $P_C$ panels in each columns, the total number of panels is given by $$P = P_R P_C.$$

The number of antennas per panel remains the same as discussed above for the dual stage structure. For such a multi-panel antenna structure, the precoder is given by a ternary/triple-stage structure $$F = F_3 F_1 F_2$$

where $F_3$ is a wideband phase compensation matrix of size P×N, which is used to compensate for the phase offset between multiple panels given by $$F_3 = [e^{j\Theta_1} e^{j\Theta_2} \ldots e^{j\Theta_P}]^T \otimes I_N$$

where $e^{j\Theta_p}$ is the phase compensation factor per panel. Here N denotes the total number of antennas per panel including all polarizations/orientations. The matrices $F_1$ and $F_2$ are used for precoding within a panel and have the same functionality as described in the dual-stage structure.

For the present invention, the precoder coefficients of delay 1 and panel p may be written as $$k(l,p) = K_3(p) K_1(l,p) K_2(p).$$

The matrix $K_3(p)$ is a wideband matrix defined by the phase compensation factor given by $$K_3(p) = e^{j\Theta_p} \otimes I_N,$$

and the matrix $K_1$ and vector $K_2$ may be identical or different across the panels i.e., they can be panel specific or panel non-specific.

In the panel specific case, feedback for matrix $K_1$ and vector $K_2$ along with the phase compensation factor per panel, respectively, is fed back to the gNB.

In the panel non-specific case, the feedback for matrix $K_1$ and vector $K_2$ for a single panel along with the phase compensation factors per panel is fed back to the gNB.

For the panel specific and panel non-specific case, the feedback for matrix $K_1$ and vector $K_2$ described in the feedback schemes 1, feedback 2 and feedback 3 for the polarimetric and non-polarimetric case applies.

The feedback for the phase compensation factors across panels may be implicit via the index (PMI3) chosen or selected from a modulation scheme constellation or from a DFT codebook or may be explicit. For the explicit case, P phase compensation factors are fedback, whereas in the implicit case, PMI3 is used for the feedback.

Table 3 below summarizes the feedback for matrix $K_3$ in the panel specific and panel non-specific cases.

| Feedback scheme | | Total feedback for ternary/triple precoder structure |
|---|---|---|
| Panel specific case | Explicit feedback of $K_3$ and feedback of $K_1$ and $K_2$ | P angles + Feedback of $K_1$ and $K_2$ per panel |
| | Implicit feedback of $K_3$ and feedback of $K_1$ and $K_2$ | 1 PMI3 + Feedback of Feedback of $K_1$ and $K_2$ per panel |
| Panel non-specific | Explicit feedback of $K_3$ and feedback of $K_1$ and $K_2$ | P angles + Feedback of $K_1$ and $K_2$ for single panel |
| | Implicit feedback of $K_3$ and feedback of $K_1$ and $K_2$ | 1 PMI3 + Feedback of $K_1$ and $K_2$ for single panel |

2$^{nd}$ Embodiments: Frequency-Domain Representation of the Space-Delay Precoder In the embodiments described so far the space-delay precoder k(l) is represented in the time domain. However, the inventive approach is not limited to such embodiments, and in accordance with further embodiments of the inventive approach the space-delay precoder k(l) is represented in the frequency domain.

The feedback schemes, which are based on a frequency-domain representation of the space-delay precoder, are now described for non-polarimetric cases in a system employing a rank-1 or layer-1 communication. In the case of antenna-specific delays, $\tau_1(l) \neq \tau_n(l) \neq \tau_N(l)$, $\forall l$, i.e., the $l_{th}$ delay is different across the transmit antennas. In case of non-antenna specific delays, $\tau_1(l) = \tau_n(l) = \tau_N(l)$, $\forall l$, i.e., the $l_{th}$ delay is identical across all transmit antennas. As mentioned above, the present invention is not limited to rank-1 embodiments and may also be implemented in a communication system employing a higher rank or layer communication, and the extension to a rank-R transmission is straightforward. Further, the extension to polarimetric cases is straightforward (see above).

The complex coefficients describing the space-delay precoder may be fed back using codebook and non-codebook based schemes, e.g., in a way as described above with reference to the first embodiment, and the delays may be fed back explicitly or implicitly. The implicit delay feedback may use a delay identifier, DI. Each DI may include indices associated with respective column vectors of a codebook matrix used at the transmitter, The space-delay precoder k(l) is described using the complex coefficients corresponding to the $l_{th}$-delay position of all antennas as follows $$k(l) = [k_1(l) k_2(l) \ldots k_N(l)]^T \in \mathbb{C}^N$$

The space-delay precoder k(l) may be transformed to the frequency-domain by applying a NU-DFT matrix. To do this, the vectors k(l) for the L delays are stacked in a matrix $\tilde{K}$, $$\tilde{K} = [k(1) \ldots k(l) \ldots k(L)] \in \mathbb{C}^{N \times L}.$$

In the following, the antenna-specific and the antenna-non-specific cases are treated separately. Further, in the following, the double stage precoder structure used in 3GPP (see reference [7]) is adopted and a rank-1 transmission is considered. Moreover, in the following we consider the case of dual-polarized antenna arrays, such that P=2. Then the precoder for a subcarrier s is given by $$F(s) = F_1 F_2(s) = \sum_{u=1}^{2U} \bar{s}_u f_{2,u}(s), \text{ where}$$

$$\bar{s}_u = \begin{bmatrix} s_u \\ 0_{\frac{N}{2}} \end{bmatrix} \in \mathbb{C}^N, \forall u = 1 \ldots U,$$

$$\bar{s}_{U+u} = \begin{bmatrix} 0_{\frac{N}{2}} \\ s_u \end{bmatrix} \in \mathbb{C}^N, \forall u = 1 \ldots U, \text{ and}$$

$f_{2,u}(s) \in \mathbb{C}$ denotes the complex coefficient associated with beam u and subcarrier s.

Collecting the precoders for all subcarriers in the matrix F, one obtains $$F = F_1[F_2(0) F_2(2) \ldots F_2(S-1)] = F_1 F_2$$

(a) Antenna-Specific Case:

For the antenna-specific case, the corresponding frequency-domain precoder for $\tilde{K}$ is given by $$F = \check{K} \check{W},$$

where the entries of $\tilde{K}$ are arranged in a block-diagonal matrix $\check{K}$, $$\check{K} = \begin{bmatrix} k_1^T & 0_L^T & & 0_L^T \\ 0_L^T & k_2^T & & 0_L^T \\ \vdots & \vdots & \ldots & \vdots \\ 0_L^T & 0_L^T & & k_N^T \end{bmatrix} \in \mathbb{C}^{N \times LN}$$

with $k_n = [k_n(1) \ldots k_n(l) \ldots k_n(L)]^T \in \mathbb{C}^{L \times 1}$ being the delay-domain precoder coefficients for the space-delay precoder for the L delays and the n-th transmit antenna, and $0_L$ is the all zero-element column vector of size L. The NU-DFT matrix $\check{W}$ of size LN×S is given by $$\check{W} = [\check{W}_1 \check{W}_2 \ldots \check{W}_N]^T,$$

where the NU-DFT submatrix $\check{W}_n = [w_{n,1} \; w_{n,2} \ldots w_{n,L}] \in \mathbb{C}^{S \times L}$ contains L vectors $$w_{n,l} = \begin{bmatrix} 1 & \ldots & e^{\frac{-j2\pi s}{S} \tau_n(l)} & \ldots & e^{\frac{-j2\pi(S-1)}{S} \tau_n(l)} \end{bmatrix}^T \in \mathbb{C}^{S \times 1}.$$

The vector $w_{n,l}$ depends on the delay $\tau_n(l)$ and antenna index n.

The number of delays defined per antenna can be different.

(b) Non-Antenna-Specific Case:

For the non-antenna-specific case, the corresponding frequency-domain precoder for $\tilde{K}$ is given by $$F = \tilde{K} \tilde{W},$$

where $\tilde{W} = [w_1 \; w_2 \ldots w_L]^T \in \mathbb{C}^{L \times S}$ is the NU-DFT matrix defined for L delays with $w_l$ being the NU-DFT vector associated with delay $\tau(l)$, $$w_l = \begin{bmatrix} 1 & \ldots & e^{\frac{-j2\pi s}{S} \tau(l)} & \ldots & e^{\frac{-j2\pi(S-1)}{S} \tau(l)} \end{bmatrix}^T \in \mathbb{C}^{S \times 1}.$$

Implicit Delay (DI) Feedback

In accordance with embodiments, the delay of the space-delay precoder k(l) represented in the frequency domain may be fed back implicitly, e.g., using one or more indices associated with respective column vectors of a frequency-domain codebook matrix used at the receiver. For example, a precoding matrix identifier (PMI) may be employed, and the PMI may correspond to a set of indices, where each index refers to a specific column in a DFT codebook. In accordance with embodiments, a first number of indices in the PMI indicates the respective beams, a second number of indices in the PMI indicates the respective delay-domain precoder coefficients, and a third number of indices, which are the indices of the delay identifier, DI.

(a) Codebook-Based DI Feedback

In the case of an implicit DI feedback, in accordance with embodiments, the DI contains a set of L indices which are associated with column vectors of a frequency-domain codebook matrix D. The delays $\tau(l) \in \mathbb{Z}$, $\forall l$ are discretized and are given by elements of a set $\mathbb{Z} = [0, \ldots, SO_f - 1]$. Moreover, each value in $\mathbb{Z}$ is associated with a column vector of the frequency-domain codebook matrix D. Therefore, the NU-DFT vectors $w_l$, $\forall l$ may be represented by DFT-vectors as follows:

$$d_i = \left[1 \ \ldots \ e^{\frac{-j2\pi i}{O_f S}} \ \ldots \ e^{\frac{-j2\pi i(S-1)}{O_f S}}\right]^T \in \mathbb{C}^{S \times 1},$$

$i \in \mathbb{Z}$ with $O_f$ being the oversampling factor of the codebook DFT-matrix $D = [d_0, d_1, \ldots, d_{SO_f - 1}]$ and $j = \sqrt{-1}$.

The codebook matrix D is parameterized by the number of subcarriers and the oversampling factor $O_f$.

When $O_f = 1$, the codebook matrix D is given by an S×S DFT-matrix.

When $O_f > 1$, the codebook matrix D is given by an oversampled DFT-matrix of size $S \times (O_f S - 1)$.

The oversampling factor $O_f$ is signaled from the transmitter to the receiver such that the receiver may construct the codebook matrix.

Based on the above definition of the frequency-domain codebook matrix D, the corresponding frequency-domain precoder for $\tilde{K}$ is defined by $$F = \tilde{K}[w_1 w_2 \ldots w_L]^T \text{ with } w_l \in D, \forall l.$$

(b) Double-Stage Precoding Structure $F = F_1 F_2$—Identical Delays for all 2U Beams In accordance with embodiments, similar to the frequency-domain double-stage precoder structure $F = F_1 F_2$, the space-delay precoder for the l-th delay may be expressed as $$k(l) = K_1(l) K_2(l)$$

where $K_1$ is a matrix of size N×2U that contains 2U spatial beams, and $K_2(l)$ is a vector of size 2U×1, $$K_2(l) = [K_{2,1}(l) \ldots K_{2,u}(l) \ldots K_{2,2U}(l)]^T \in \mathbb{C}^{2U \times 1}$$

with $K_{2,u}(l)$ being a scalar complex delay-domain combining coefficient associated with u-th beam and the l-th delay. When $K_1(l)$ is a wideband matrix, the space-delay precoder matrix $\tilde{K}$ may be expressed as $$\tilde{K} = K_1 K_2$$

where $K_1$ is identical to matrix $F_1$, and $K_2 = [K_2(1) \ldots K_2(l) \ldots K_2(L)] \in \mathbb{C}^{2U \times L}$. Therefore, the double-stage precoding structure $F = F_1 F_2$ may be written as $$F = K_1 K_2 \tilde{W}, F_1 = K_1, F_2 = K_2 \tilde{W}.$$

The delays $\tau(l)$, $\forall l$ in the DI used in matrix $\tilde{W}$ are identical to all 2U beams in matrix $K_1$.

(c) Extension to Beam-Specific Delays—Polarization and Beam Dependent Delays

In accordance with embodiments, when $K_1(l)$ is a wideband matrix and the combination of beams for the l-th delay may differ to other delays, and the delays associated with the 2U beams may be different. Therefore the 2U beams may be associated with 2U DIs. The u-th DI is then associated with the beam index u and with $\bar{L}$ delays $\tau_u(l)$, $l = 1, \ldots, \bar{L}$, where the $\bar{L}$ delays may be identical or non-identical for different beams. Also, each beam can have different number of delays $\bar{L}$. The frequency domain precoder may then be represented by $$F = K_1 \check{K}_2 \cdot W,$$

where the matrix $\check{K}_2$ is the space-delay-domain combining coefficient matrix, defined as $$\check{K} = \begin{bmatrix} K_{2,1} & 0_L^T & & 0_L^T \\ 0_L^T & K_{2,2} & & 0_L^T \\ \vdots & \vdots & \ldots & \vdots \\ 0_L^T & 0_L^T & & K_{2,2U} \end{bmatrix} \in \mathbb{C}^{2U \times 2\bar{L}U}$$

with $K_{2,u} = [K_{2,u}(1) \ldots K_{2,u}(l) \ldots K_{2,u}(\bar{L})] \in \mathbb{C}^{1 \times \bar{L}}$ being the delay-domain combining coefficients associated with beam u. Furthermore, W is given by $$W = [W_1 W_2 \ldots W_{2U}]^T \in \mathbb{C}^{2\bar{L}U \times S}$$

with $W_u = [w_{u,1} w_{u,2} \ldots w_{u,\bar{L}}] \in \mathbb{C}^{S \times \bar{L}}$ being the DFT matrix associated with beam u, whose $\bar{L}$ columns are selected from the codebook D.

The matrix $F_2$ containing the frequency-domain combining-coefficients $f_{2,u}$ may be expressed as $$F_2 = [f_{2,1} f_{2,2} \ldots f_{2,2U}]^T$$

where $$f_{2,u} = \sum_{l=1}^{\bar{L}} w_{u,l} K_{2,u}(l) \text{ with } w_{u,l} \in D. = W_u K_{2,u}^T.$$

Therefore, the precoder F may then be written as $$F = \sum_{u=1}^{2U} \bar{s}_u \cdot \left(\sum_{l=1}^{\bar{L}} w_{u,l}^T K_{2,u}(l)\right)$$

(c.1) Beam-Specific Delays—Special Case of Polarization-Independent and Beam-Dependent Delays In accordance with embodiments, the delays $\tau_u(l)$ are polarization-independent and beam-dependent, and the following applies:

$$\tau_u(l) = \tau_{U+u}(l), l = 1, \ldots, L, \forall u.$$

Then, the following relation holds for the frequency domain vector $w_{u,1}$:

$$w_{u,l} = w_{U+u,l}, \forall l, \forall u.$$

Therefore, instead of the 2U DI feedback only U DIs need to be fed back to the transmitter.

(c.2) Beam-Specific Delays—Special Case of Polarization-Dependent and Beam-Independent Delays In accordance with embodiments, the delays are polarization-dependent and beam-independent, and the following applies:

$$\tau_u(l) = \tau^{(1)}(l), \tau_{U+u}(l) = \tau^{(2)}(l), \forall l, u=1, \ldots, U,$$

where $\tau^{(1)}(l) \neq \tau^{(2)}(l)$.

Then, the following relation holds for the frequency domain vector $w_{u,l}$ $$w_{u,l} = w_l^{(1)}, w_{U+u,l} = w_l^{(2)} \forall l, u=1, \ldots, U$$

with $w_l^{(1)} \neq w_l^{(2)}$.

Therefore, instead of the 2U DI feedback only two DIs, 2 DIs, need to be fed back to the transmitter, where the first DI refers to the delays of the first polarization of the antenna array, and the second DI refers to the delays of the second polarization of the antenna array The following table summarizes the total amount of feedback for matrix $K_2$ and the number of DIs for various feedback embodiments.

| | Number of delay-domain complex delay-domain combining coefficients ($K_2$) | Delay-identifier: Number of indices to indicate the columns of the frequency domain codebook |
|---|---|---|
| Identical delays for all 2U beams → see (b) | 2LU complex coefficients | 1 DI |
| Polarization and beam dependent delays → see (c) | 2L̄U complex coefficients | 2U DIs |
| Polarization independent and beam dependent delays → see (c.1) | 2L̄U complex coefficients | U DIs |
| Polarization dependent and beam independent delays → see (c.2) | 2L̄U complex coefficients | 2 DIs |

(c.3) Beam-Specific Delays—Special Case of d Identical Delays Out of L Delays

In accordance with embodiments, d indices out of L̄ indices in a DI associated with the u-th beam may be identical to the delay indices of the DIs associated with other beams. In such a case, the DI of the u-th beam may have only L̄-d indices instead of L̄ indices.

In addition to beam-specific DIs that contain indices for specific spatial beams, a DI common to X (X=1 . . . PU) spatial beams may be used to denote indices common to X spatial beams. Such multiple common DIs may become relevant when there are multiple sets of identical delays among DIs of different spatial beams.

The DI configuration may be signaled from the transmitter to the receiver. A DI configuration for example may contain information about:
  total number of indices per beam-specific DI, or
  number of common DIs, number of indices per common DI.

(c.4) Beam-Specific Delays—Restriction of Delays

Figure 5:
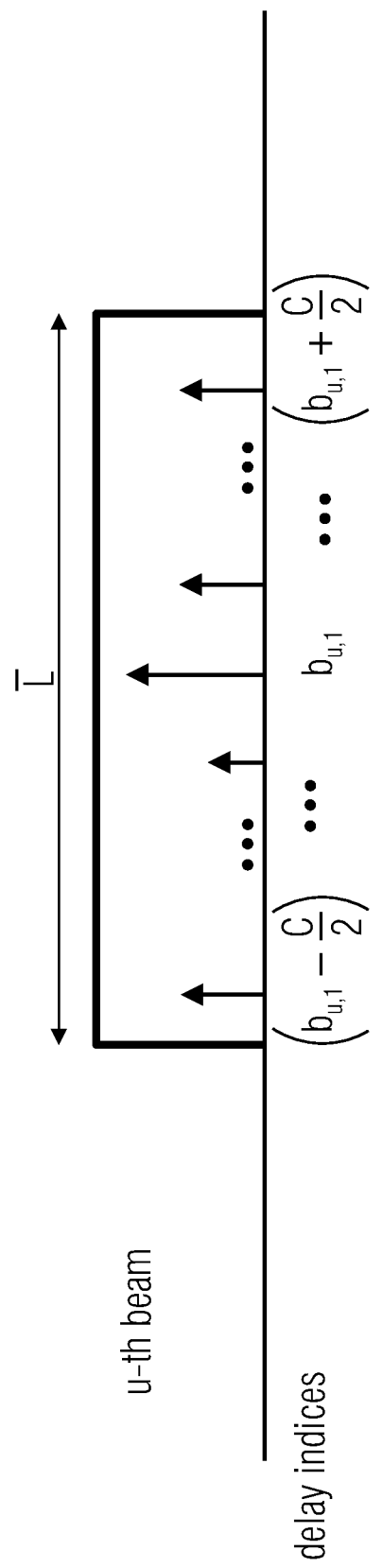
FIG. 5 illustrates the $\Gamma$ delay indices for the u-th beam centered around the mean delay index $b_{u,1}$.

In accordance with further embodiments, for each beam the L̄ delays may be centered or restricted to lie around a single mean delay. Then, the frequency domain codebook matrix $\overline{W}_u$ for the u-th beam is given by $$\hat{W}_{b_{u,1}} = \left[ d_{(b_{u,1} - \frac{c}{2})} \ldots d_{b_{u,1}} \ldots d_{(b_{u,1} + \frac{c}{2})} \right] \in \mathbb{C}^{S \times \overline{L}},$$

where $\overline{L} = C+1$ with C being a window parameter, and $b_{u,1}$ is the index associated with the mean delay, see FIG. 5 which illustrates the L̄ delay indices for the u-th beam centered around the mean delay index $b_{u,1}$. The window-size parameter C can be identical or different for the spatial beams, and is signaled via a control channel or via higher layer-signaling from the transmitter to the receiver.

For each beam, L̄ delay-domain complex combing-coefficients coefficients are fed back to the transmitter. However, instead of the feedback of L̄ delays per beam, a single index $b_{u,1}$ of the associated mean delay is sufficient to be fed back to the transmitter.

For example, when the window-size parameter C is identical for all beams, the total feedback amounts to 2L̄U complex delay-domain combining coefficients and 2U DIs for 2U beams, where each DI contains only a single index.

Figure 6:
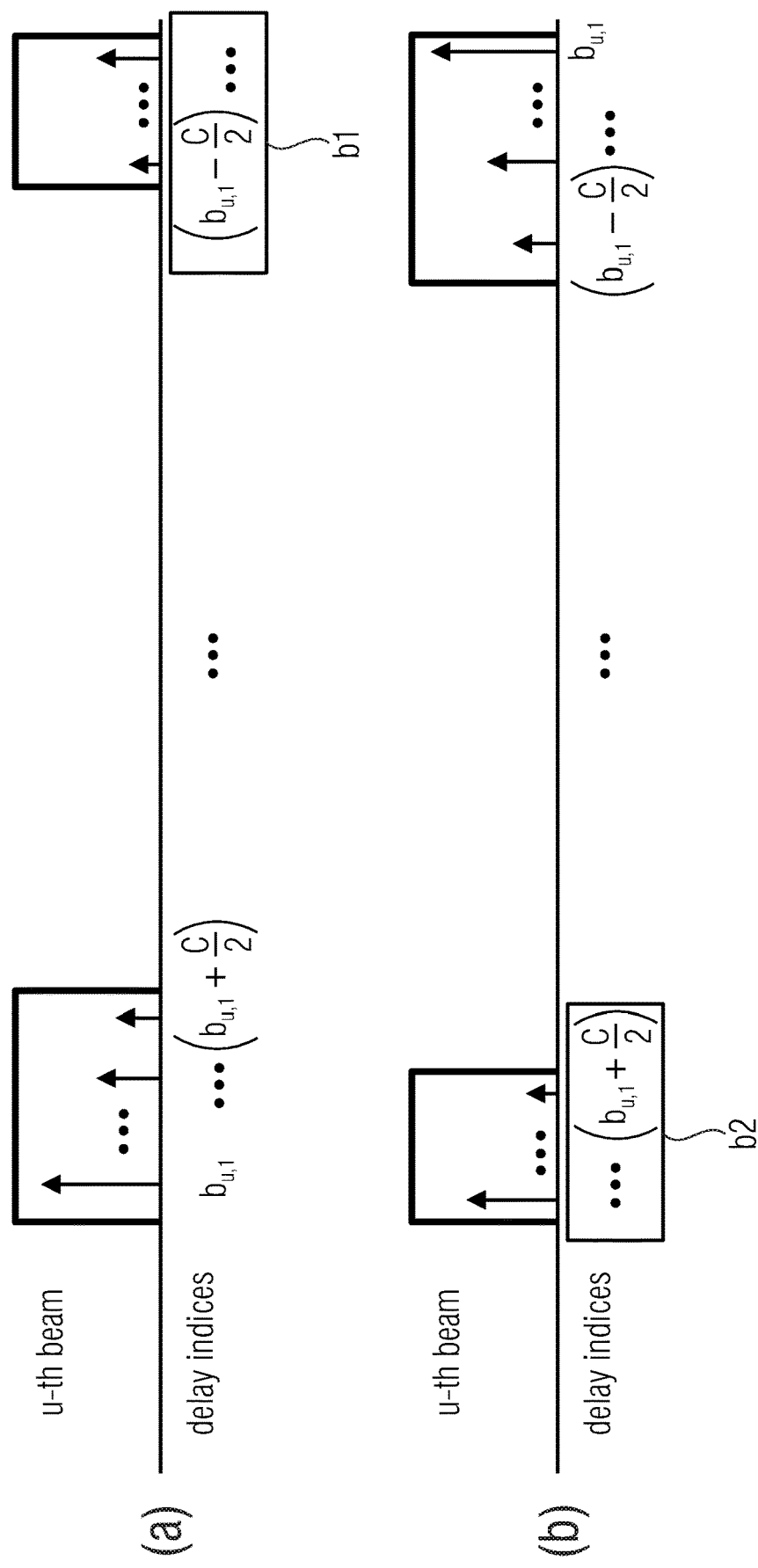
FIG. 6 illustrates illustrate possible locations (see FIG. 6(a) and FIG. 6(b)) for the mean delay of FIG. 5 lying at the beginning and/or at the end of the sampling grid.

The optimized mean delay may lie at the beginning or at the end of the defined sampling grid as shown in FIG. 6. FIG. 6(a) and FIG. 6(b) illustrate possible locations for the mean delay of FIG. 5 lying at the beginning and/or at the end of the sampling grid. In such cases, a modulo operation may be used to calculate the correct positions (indices) of the delays around the mean delay. The indices for which the modulo operation is needed are highlighted in the boxes b1, b2.

Figure 7:
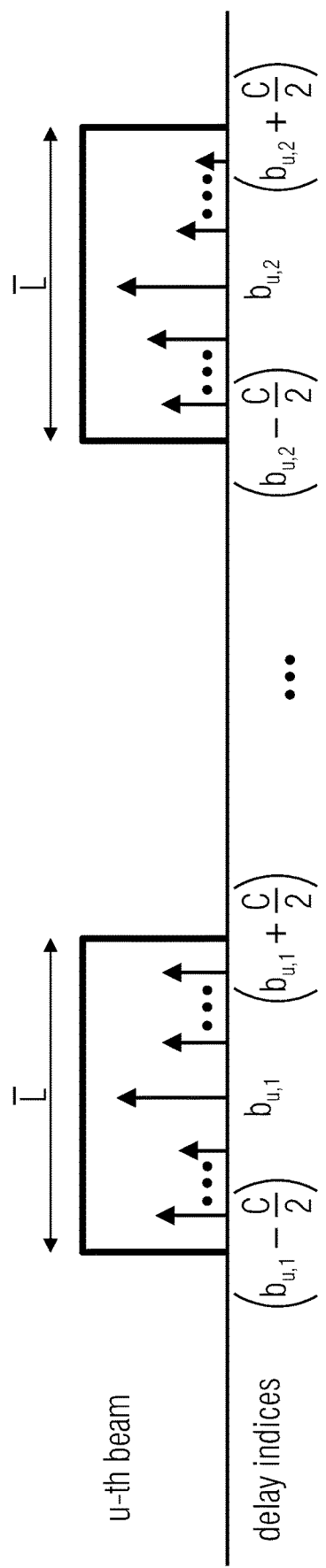
FIG. 7 illustrates the C delay indices centered around two mean delay indices $b_{u,1}$ and $b_{u,2}$ for the u-th beam.

Extension to Multiple Mean Delays Per Beam:

Instead of having a single mean delay, in accordance with embodiments, the above case may be extended to multiple mean delays. Similar to the single mean delay case, C delays are optimized around each mean delay as shown in FIG. 7, which illustrates the C delay indices centered around two mean delay indices $b_{u,1}$ and $b_{u,2}$ for the u-th beam.

For example, when the window-size parameter C is identical for all beams and all mean delays, for $\tilde{L}$ mean delays per beam, the total feedback amounts to 2L̄L̃U complex delay-domain combining coefficients and 2U DIs for 2U beams, where each DI contains $\tilde{L}$ indices.

Figure 8:
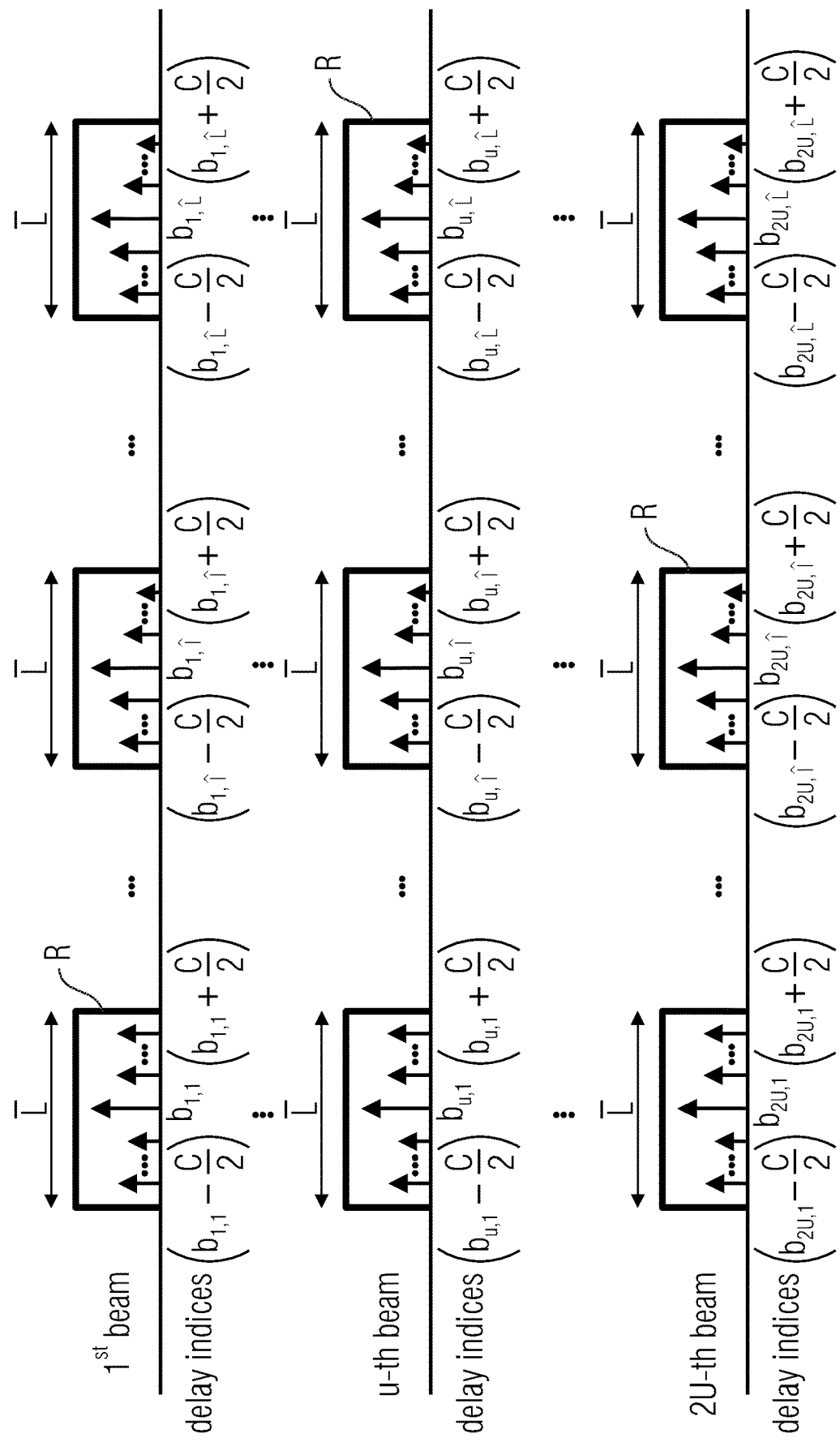
FIG. 8 illustrates the calculating of the complex coefficients of the (2U−1) beams with respect to a reference beam for the mean delay $b_{u,i}$.

(c.5) Beam-Specific Delays—Kronecker Product Structure for Delay-Domain Combining Coefficients for the Case of Restricted Delays In accordance with yet other embodiments, L̄ complex delay-domain coefficients of the u-th beam associated with the mean delay index $b_{u,\tilde{l}}$ are used to calculate the combining-coefficients of all other 2U-1 beams. In the following, we consider a single mean delay and a single spatial beam. Collecting L̄ delay-combining coefficients associated with the u-th beam and mean delay index $b_{u,\tilde{l}}$ ($\tilde{l}$ ranges from 1 to 2U) in a row vector $K_{2,u} \in \mathbb{C}^{1 \times \overline{L}}$, the complex delay-domain combining-coefficients of the remaining 2U-1 beams (g≠u) associated with the mean delay index $b_{u,\tilde{l}}$ can be calculated by $$\hat{K}_2 = [e_{1,u} \ldots e_{g,u} \ldots e_{2U-1,u}]^T \otimes K_{2,u} \in \mathbb{C}^{2U \times \overline{L}}$$

where $e_{g,u}$ is the scalar complex coefficient associated with the g-th beam. FIG. 8 illustrates the calculating of the complex coefficients of the (2U-1) beams with respect to the reference beam (box R) for the mean delay $b_{u,\tilde{l}}$ Note that for the above Kronecker product structure, in addition to the feedback of the 2U delay-domain combining-coefficient vectors $K_{2,u}$, the complex-combing coefficients $e_{g,u}$ need to be fedback to the transmitter.

Normalization of Delays

In accordance with other embodiments the delays may be normalized with respect to a single reference delay. A reference delay may be set and the L delays corresponding to all beams or all antennas are subtracted from a single reference delay. Any l-th delay in the set of L delays may be chosen as the reference delay. In the case of explicit feedback of delays, the L−1 delay differences are feed back to the transmitter instead of the delays. In the case of implicit feedback of delays, L−1 delay differences are given by elements of the set $\mathbb{C} = [0, \ldots, SO_f - 1]$, and the DIs contain indices associated with the delay differences.

Specific Case of Per Beam/Antenna Normalization:

A reference delay may also be set per beam or per antenna and the L delays corresponding to each beam or each antenna are subtracted from the beam- or antenna-specific reference delay. In the case of implicit feedback of delays, the L−1 delay differences are given by elements of the set $\mathbb{C} = [0, \ldots, SO_f - 1]$, and the DIs contain indices associated with the delay differences.

In the embodiments described herein the feedback may be signaled using a feedback channel between a user equipment and a base station as shown in FIG. 2, FIG. 3 or FIG. 4. The feedback may also be signaled or transmitted via a control channel, like the PUCCH, or it may signaled via higher layer signaling, like RRC signaling.

The embodiments of the present invention have been described above with reference to a communication system employing a rank-1 or layer-1 communication. However, the present invention is not limited to such embodiments and may also be implemented in a communication system employing a higher rank or layer communication. In such embodiments, the feedback includes the delays per layer and the complex precoder coefficients per layer.

The embodiments of the present invention have been described above with reference to a communication system in which the transmitter is a base station serving a user equipment, and the receiver is the user equipment served by the base station. However, the present invention is not limited to such embodiments and may also be implemented in a communication system in which the transmitter is a user equipment served by a base station, and the receiver is the base station serving the user equipment.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 9:
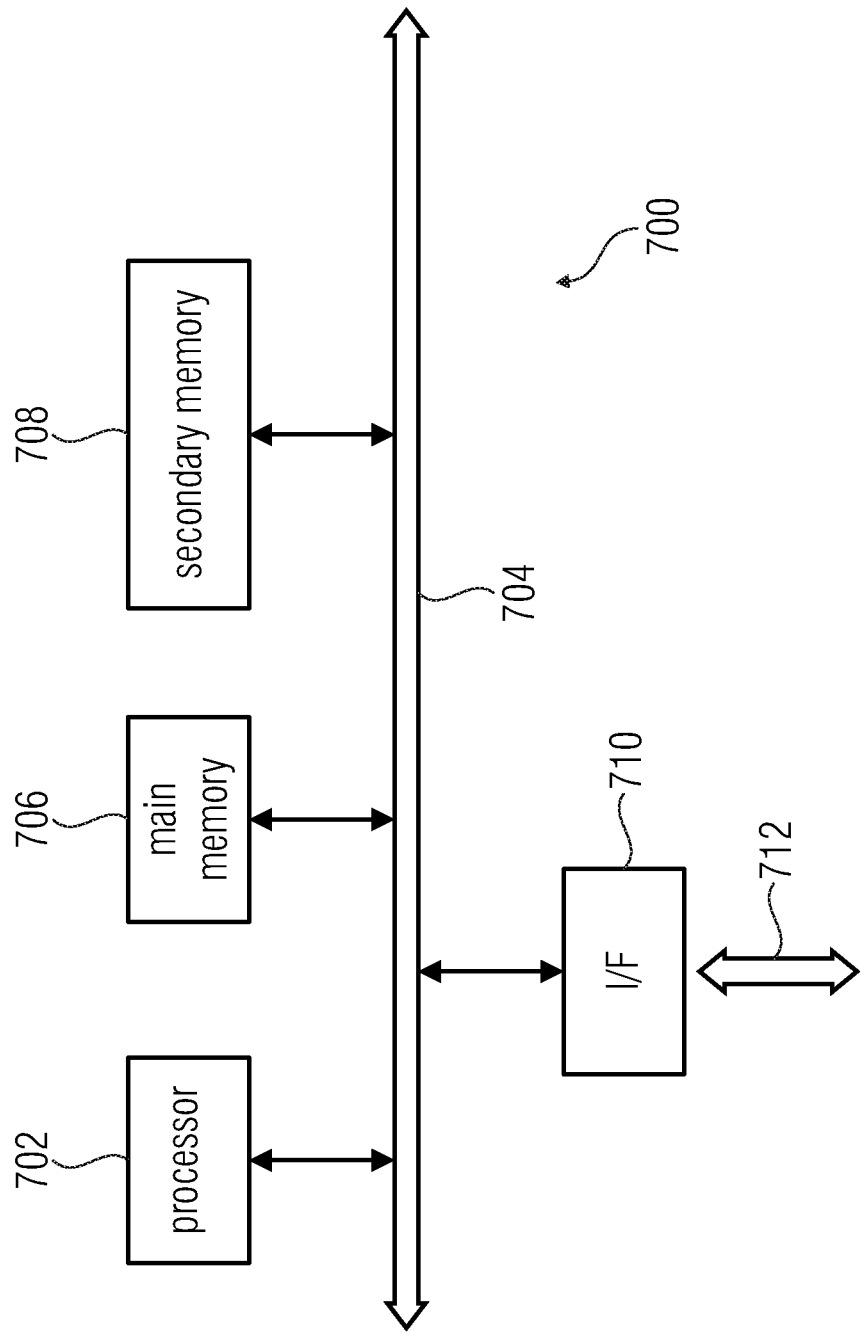
FIG. 9 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 9 illustrates an example of a computer system 700. The units or modules as well as the steps of the methods performed by these units may execute on one or more computer systems 700. The computer system 700 includes one or more processors 702, like a special purpose or a general purpose digital signal processor. The processor 702 is connected to a communication infrastructure 704, like a bus or a network. The computer system 700 includes a main memory 706, e.g., a random access memory (RAM), and a secondary memory 708, e.g., a hard disk drive and/or a removable storage drive. The secondary memory 708 may allow computer programs or other instructions to be loaded into the computer system 700. The computer system 700 may further include a communications interface 710 to allow software and data to be transferred between computer system 700 and external devices. The communication may be in the form electronic, electromagnetic, optical, or other signals capable of being handled by a communications interface. The communication may use a wire or a cable, fiber optics, a phone line, a cellular phone link, an RF link and other communications channels 712.

The terms "computer program medium" and "computer readable medium" are used to generally refer to tangible storage media such as removable storage units or a hard disk installed in a hard disk drive. These computer program products are means for providing software to the computer system 700. The computer programs, also referred to as computer control logic, are stored in main memory 706 and/or secondary memory 708. Computer programs may also be received via the communications interface 710. The computer program, when executed, enable the computer system 700 to implement the present invention. In particular, the computer program, when executed, enable processor 702 to implement the processes of the present invention, such as any of the methods described herein. Accordingly, such a computer program may represent a controller of the computer system 700. Where the disclosure is implemented using software, the software may be stored in a computer program product and loaded into computer system 700 using a removable storage drive, an interface, like communications interface 710.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Erik Dahlman, Stefan Parkvall, Johan Sköld, "4G: LTE/LTE-Advanced for Mobile Broadband," Academic Press, 2011. (ISBN:012385489X 9780123854896)
[2] 3GPP TR 36.897 V13.0.0, "3rd Generation Partnership Project; Technical Specification Group Radio Access Network; Study on elevation beamforming/Full-Dimension (FD) Multiple Input Multiple Output (MIMO) for LTE (Release 13)," June 2015.
[3] Cheng et al., "Two-dimensional Discrete Fourier Transform based Codebook for Elevation Beamforming," United States Patent Application, US 2016/0173180 A1, June 2016.
[4] 3GPP TS 36.211, "Technical Specification Group Radio Access Network; Evolved Universal Terrestrial Radio Access (E-UTRA); Physical Channels and Modulation (Release 10)," V10.4.0, December 2011.
[5] 3GPP TR 38.802 V14.1.0, "3rd Generation Partnership Project; Technical Specification Group Radio Access Network; Study on New Radio access technology: Physical layer aspects (release 14)," June 2017.
[6] J. A. Fessler and A. O. Hero, "Space-alternating generalized expectation-maximization algorithm," IEEE transactions on Signal Processing, vol. 42, no. 10, pp. 2664-2677, October 1999.
[7] 3GPP TS 38.214 V13.0.0, "3rd Generation Partnership Project; Technical Specification Group Radio Access Network; NR; Physical layer procedures for data (Release 15)," January 2018.

The invention claimed is:

1. A receiver, configured to
receive and process a radio signal received via a radio channel from a transmitter employing a plurality of antennas or antenna ports,
determine, based on the received signal, complex precoder coefficients and delays of respective space-delay precoders for each layer and transmit beam at the transmitter so as to achieve a predefined property for a communication over the radio channel,
each space-delay precoder comprising:
a double-stage precoding structure, the double-stage precoding structure including a beamforming matrix that contains PU vectors to form PU spatial beams, U=total number of vectors per polarization, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including complex delay-domain combining-coefficients associated with the beams and the delays,
provide a feedback to the transmitter the determined delays and the determined complex precoder coefficients, the complex precoder coefficients including the complex delay-domain combining-coefficients,
wherein the feedback includes a precoding matrix identifier (PMI), the PMI indicating a number of indices of the vectors associated with the spatial beams, respective complex delay-domain combining-coefficients, and a number of indices of the delays associated with respective column vectors of a codebook matrix.

2. The receiver of claim 1, wherein the respective column vectors are non-uniform discrete Fourier transform (NU-DFT)-based vectors.

3. The receiver of claim 2, wherein the space-delay precoder for each layer and S subbands is given by $F=K_1 K_2 \tilde{W}$, wherein $K_1$ is the beamforming matrix, $K_2$ is the space-delay-domain combining coefficient vector or matrix including the complex delay-domain combining-coefficients, and $\tilde{W}$ is a matrix of respective NU-DFT-based vectors associated with the delays.

4. The receiver of claim 1, wherein the U vectors of the beamforming matrix are identical for both polarizations, and the PMI indicates U indices of the vectors associated with the spatial beams.

5. The receiver of claim 1, wherein the U vectors of the beamforming matrix are selected from a DFT-based codebook matrix.

6. The receiver of claim 1, wherein the codebook matrix includes a DFT-based matrix.

7. The receiver of claim 1, wherein
the delays, $\tau(l) \in \mathbb{C}$, $\forall l$, are discretized and are given by elements of a set $\mathbb{C}=[0, \ldots, SO_f-1]$, and each value in $\mathbb{C}$ is associated to a column vector of a frequency-domain codebook matrix D, with $l=1, \ldots, L$, S=total number of subbands.

8. The receiver of claim 1, wherein a delay identifier (DI), is associated with a spatial beam, and the feedback includes PU DIs for PU spatial beams, U=total of vectors per polarization, P=number of polarizations, where P=1 for co-polarized antenna arrays at the transmitter and P=2 dual-polarized antenna arrays at the transmitter.

9. The receiver of claim 1, wherein
(i) in case of identical delays for all PEI beams, the feedback includes one delay identifier, 1 DI, for the PU beams, or
(ii) in case of polarization-dependent and beam-dependent delays, the feedback includes PU delay identifiers, PU DIs, for the PU beams, each DI indicating indices of delays associated with a single spatial beam, or
(iii) in case of polarization-independent and beam-dependent delays, the feedback includes U delay identifiers, U DIs, for the FU beams, or
(iv) in case of polarization-dependent and beam-independent delays, the feedback includes two delay identifiers, P DIs, for the PU beams.

10. The receiver of claim 8, wherein the number of indicated indices in the DIs is identical or different with respect to the spatial beams.

11. The receiver of claim 1, wherein d delay indices out of $\bar{L}$ delay indices in a delay identifier, DI, associated with a u-th spatial beam, are identical to the delay indices of DIs associated with one or more other spatial beams, then the DI of the u-th spatial beam contains $\bar{L}$-d indices instead of $\bar{L}$ indices.

12. The receiver of claim 1, wherein the feedback includes, in addition to beam-specific DIs a common DI, the common DI indicating indices common to one or more spatial beams.

13. The receiver of claim 1, wherein a DI configuration may be signaled from the transmitter to the receiver, wherein the DI configuration may contain information about:
   total number of indices for a beam-specific DI,
   number of common DIs, and/or
   number of indices per common DI.

14. The receiver of claim 1, wherein, in case the delays associated with a spatial beam are within a predefined window around a single mean delay, a delay identifier for the spatial beam includes only a single index associated with the mean delay.

15. The receiver of claim 13, wherein, in case of PU beams, the feedback includes PU DIs for the PU beams, with each DI indicating only a single index.

16. The receiver of claim 13, wherein the feedback includes a single or multiple DIs for the spatial beams, with each DI indicating a single or multiple indices, and each index is associated with a specific mean delay of the beam.

17. The receiver of claim 13, wherein the PU spatial beams have the same or different mean delays.

18. The receiver of claim 1, wherein the receiver is configured to feed back the delays of the space-delay precoder implicitly by setting a reference delay to all beams, L−1 indices associated with the L−1 delay differences with respect to the reference delay are fed back.

19. A transmitter, comprising:
   an antenna array having a plurality of antennas for a wireless communication with one or more receivers; and
   a precoder connected to the antenna array, the precoder to apply a set of beamforming weights to one or more antennas of the antenna array to form, by the antenna array, one or more transmit beams,
   wherein the transmitter is configured to determine the beamforming weights responsive to a feedback received from a receiver, the feedback indicating delays and complex precoder coefficients, the indicated delays and complex precoder coefficients obtained based on respective space-delay precoders for each layer and transmit beam at the transmitter so as to achieve a predefined property for a communication over a radio channel to the receiver, the complex precoder coefficients including complex delay-domain combining-coefficients, and each space-delay precoder comprising:
      a double-stage precoding structure, the double-stage precoding structure including a beamforming matrix that contains PU vectors to form PU spatial beams for the antennas at the transmitter, U=total number of vectors per polarization, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including the complex delay-domain combining-coefficients associated with the beams and the delays, and
   wherein the feedback includes a precoding matrix identifier (PMI), the PMI indicating a number of indices of the vectors associated with the spatial beams, respective complex delay-domain combining-coefficients, and a number of indices of the delays associated with respective column vectors of a codebook matrix.

20. A wireless communication network, comprising:
   at least one receiver, configured to
   receive and process a radio signal received via a radio channel from a transmitter employing a plurality of antennas or antenna ports,
   determine, based on the received signal, complex precoder coefficients and delays of respective space-delay precoders for each layer and transmit beam at the transmitter so as to achieve a predefined property for a communication over the radio channel,
   each space-delay precoder comprising:
      a double-stage precoding structure, the double-stage precoding structure including a beamforming matrix that contains PU vectors to form PU spatial beams, U=total number of vectors per polarization, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including complex delay-domain combining-coefficients associated with the beams and the delays,
   provide a feedback to the transmitter the determined delays and the determined complex precoder coefficients, the complex precoder coefficients including the complex delay-domain combining-coefficients,
   wherein the feedback includes a precoding matrix identifier (PMI), the PMI indicating a number of indices of the vectors associated with the spatial beams, respective complex delay-domain combining-coefficients, and a number of indices of the delays associated with respective column vectors of a codebook matrix; and
   at least one transmitter of claim 19.

21. The wireless communication network of claim 20, wherein the transmitter comprises a base station serving a user equipment, or a user equipment served by a base station, or the receiver comprises a base station serving a user equipment, or a user equipment served by a base station.

22. A method, comprising:
   receiving and processing a radio signal received via a radio channel from a transmitter employing a plurality of antennas or antenna ports,
   determining, based on the received signal, complex precoder coefficients and delays of respective space-delay precoders for each layer and transmit beam at the transmitter so as to achieve a predefined property for a communication over the radio channel, each space-delay precoder comprising:
      a double-stage precoding structure, the double-stage precoding structure including a beamforming matrix that contains PU vectors to form PU spatial beams, U=total number of vectors per polarization, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including complex delay-domain combining-coefficients associated with the beams and the delays, and providing a feedback to the transmitter the determined delays and the determined complex precoder coefficients, the complex precoder coefficients including the complex delay-domain combining-coefficients, wherein the feedback includes a precoding matrix identifier (PMI), the PMI indicating a number of indices of the vectors associated with the spatial beams, respective complex delay-domain combining-coefficients, and a number of indices of the delays associated with respective column vectors of a codebook matrix.

23. A non-transitory computer program product comprising a computer readable medium storing instructions which, when executed on a computer, perform the method of claim 22.

24. A method for forming one or more beams for a wireless communication among a transmitter and one or more receivers, the method comprising:

applying a set of beamforming weights to one or more antennas of an antenna array to form the beam, the beam comprising a transmit beam, wherein the beamforming weights are determined responsive to a feedback received from a receiver, the feedback indicating delays and complex precoder coefficients, the indicated delays and complex precoder coefficients obtained based on respective space-delay precoders for each layer and transmit beam at the transmitter so as to achieve a predefined property for a communication over a radio channel to the receiver, the complex precoder coefficients including complex delay-domain combining-coefficients, and each space-delay precoder comprising:

a double-stage precoding structure, the double-stage precoding structure including a beamforming matrix that contains PU vectors to form PU spatial beams for the antennas at the transmitter, U=total number of vectors per polarization, and P=number of polarizations, where P=1 for co-polarized antenna arrays at the transmitter and P=2 dual-polarized antenna arrays at the transmitter, wherein the double-stage precoding structure further includes a space-delay-domain combining coefficient vector or matrix including the complex delay-domain combining-coefficients associated with the beams and the delays, and wherein the feedback includes a precoding matrix identifier (PMI), the PMI indicating a number of indices of the vectors associated with the spatial beams, respective complex delay-domain combining-coefficients, and a number of indices of the delays associated with respective column vectors of a codebook matrix.

25. A non-transitory computer program product comprising a computer readable medium storing instructions which, when executed on a computer, perform the method of claim 24.

* * * * *

UNITED STATES PATENT AND TRADEMARK OFFICE
CERTIFICATE OF CORRECTION

PATENT NO. : 10,886,985 B2  
APPLICATION NO. : 16/783994  
DATED : January 5, 2021  
INVENTOR(S) : Venkatesh Ramireddy et al.

It is certified that error appears in the above-identified patent and that said Letters Patent is hereby corrected as shown below:

In the Claims

Claim 7, Column 32, Lines 43 - 45:  
"... the delays, $\tau(l) \in C, \forall\, l$, are discretized and are given by elements of a set $C = [0, \ldots, SO_f - 1]$, and each value in $C$ is ..."  
Should read:  
"... the delays, $\tau(l) \in \mathbb{Z}, \forall\, l$, are discretized and are given by elements of a set $\mathbb{Z} = [0, \ldots, SO_f - 1]$, and each value in $\mathbb{Z}$ is ..."

Claim 9, Column 32, Line 55:  
"... delays for all PEI beams, the ..."  
Should read:  
"... delays for all PU beams, the ..."

Claim 9, Column 32, Line 64:  
"... for the FU beams, or ..."  
Should read:  
"... for the PU beams, or ..."

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*